US010560404B2

(12) United States Patent
Menchaca et al.

(10) Patent No.: US 10,560,404 B2
(45) Date of Patent: Feb. 11, 2020

(54) REAL-TIME CLOUD-BASED MESSAGING SYSTEM

(71) Applicant: Citrix Systems, Inc., Fort Lauderdale, FL (US)

(72) Inventors: Luis Garcia Menchaca, Apex, NC (US); Bradley Markus Rowe, Boca Raton, FL (US); Roberto Valdes, Weston, FL (US); Bruno Spinelli Dantas, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 121 days.

(21) Appl. No.: 15/725,897

(22) Filed: Oct. 5, 2017

(65) Prior Publication Data

US 2018/0367479 A1    Dec. 20, 2018

Related U.S. Application Data

(60) Provisional application No. 62/519,809, filed on Jun. 14, 2017.

(51) Int. Cl.
```
H04L 12/00     (2006.01)
H04L 12/58     (2006.01)
H04L 29/08     (2006.01)
```
(52) U.S. Cl.
CPC ............ *H04L 51/04* (2013.01); *H04L 67/141* (2013.01); *H04L 67/10* (2013.01); *H04L 67/26* (2013.01); *H04L 69/327* (2013.01)

(58) Field of Classification Search
CPC ......... H04L 67/02; H04L 51/04; H04L 67/10; H04L 67/26; H04L 69/327; H04L 67/141; G06F 15/17306

(Continued)

(56) References Cited

U.S. PATENT DOCUMENTS 6,404,762 B1 * 6/2002 Luzeski ................. H04L 51/36
                                                       370/230
7,269,432 B2 * 9/2007 Gress .................... H04L 51/066
                                                       455/414.1

(Continued)

OTHER PUBLICATIONS

International Search Report and Written Opinion for PCT/US2018/035402, dated Jul. 23, 2018.

*Primary Examiner* — Frantz Coby
(74) *Attorney, Agent, or Firm* — Foley & Lardner LLP; Christopher J. McKenna

(57) ABSTRACT

Described embodiments may provide messages via websocket connections. A messaging system may maintain, on a first network, via the messaging system instances, a plurality of persistent websocket connections between each of a plurality of on-premise connectors and each messaging system instance. The messaging system may receive a message to be sent to an endpoint on a second network of an on-premise connector of the plurality of on-premise connectors. The messaging system may identify, via a registry associating on-premise connector endpoints to messaging instances, a messaging system instance of the plurality of messaging system instances via which to send the message to the endpoint. The messaging system instance may maintain the websocket connection to the on-premise connector in communication with the endpoint. The messaging system instance may transmit the message to the endpoint via the websocket connection to the on-premise connector.

20 Claims, 15 Drawing Sheets

(58) Field of Classification Search
USPC .................. 709/206, 202, 204, 213, 234
See application file for complete search history.

(56) References Cited

U.S. PATENT DOCUMENTS

| | | | | |
|---|---|---|---|---|
| 7,689,707 | B2* | 3/2010 | Chobert | G06F 16/182 |
| | | | | 709/234 |
| 9,935,907 | B2* | 4/2018 | Beausoleil | H04L 51/22 |
| 2003/0115317 | A1 | 6/2003 | Hickson et al. | |
| 2007/0168184 | A1* | 7/2007 | Lee | H04L 51/00 |
| | | | | 704/204 |
| 2009/0300122 | A1* | 12/2009 | Freer | G06K 9/4604 |
| | | | | 709/206 |
| 2010/0124938 | A1* | 5/2010 | Wu | H04L 51/066 |
| | | | | 455/466 |
| 2010/0281107 | A1 | 11/2010 | Fallows et al. | |
| 2010/0306547 | A1* | 12/2010 | Fallows | G06F 21/305 |
| | | | | 713/178 |
| 2010/0318616 | A1 | 12/2010 | Langley et al. | |
| 2011/0075676 | A1* | 3/2011 | Gopalakrishnan | H04L 51/14 |
| | | | | 370/401 |
| 2011/0145836 | A1* | 6/2011 | Wheeler | G06F 9/546 |
| | | | | 719/314 |
| 2013/0019297 | A1 | 1/2013 | Lawson et al. | |
| 2013/0211559 | A1* | 8/2013 | Lawson | G06Q 10/06315 |
| | | | | 700/83 |
| 2013/0275509 | A1* | 10/2013 | Micucci | H04L 67/02 |
| | | | | 709/204 |
| 2014/0156028 | A1* | 6/2014 | Subramaniam | H04L 12/2818 |
| | | | | 700/11 |
| 2014/0181233 | A1* | 6/2014 | Peev | G06F 9/546 |
| | | | | 709/213 |
| 2014/0280460 | A1* | 9/2014 | Nemer | G06Q 30/0214 |
| | | | | 709/202 |
| 2014/0297766 | A1* | 10/2014 | Imes | H04L 51/04 |
| | | | | 709/206 |
| 2015/0277399 | A1* | 10/2015 | Maturana | G06F 9/5072 |
| | | | | 700/29 |
| 2016/0337465 | A1* | 11/2016 | Tarre | H04L 67/2823 |
| 2017/0149915 | A1* | 5/2017 | Jolfaei | H04L 67/26 |
| 2017/0163806 | A1* | 6/2017 | Shanmugam | H04M 3/5183 |
| 2019/0020606 | A1* | 1/2019 | Vasudeva | G06F 17/2785 |

* cited by examiner

Receive Channel 400A

Send Channel 400B

REAL-TIME CLOUD-BASED MESSAGING SYSTEM

CROSS-REFERENCE TO RELATED PATENT APPLICATIONS

This application claims priority to and the benefit of U.S. Provisional Application No. 62/519,809, filed Jun. 14, 2017, incorporated herein by reference in its entirety.

FIELD OF THE DISCLOSURE

The present application generally relates to messaging systems. In particular, the present application relates to systems and methods for providing messages via websocket connections.

BACKGROUND OF THE DISCLOSURE

Current cloud-based messaging systems may lack fault tolerant and fully scalable services. For example, such systems may lack bi-directional channels in which both a server and a client may simultaneously send and receive messages. In addition, these systems may suffer from high latency due to network overhead. Moreover, such systems may be unable to support variety of web standards for websites, mobile, desktop, and server-side applications to securely use messaging functionalities without complex firewall, network, or virtual private network (VPN) configurations.

BRIEF SUMMARY OF THE DISCLOSURE

This disclosure describes patterns that can be used for providing messages via websocket connections. The present systems and methods may provide an infrastructure for server-side systems and on-premise connectors to communicate. The server-side system may run multiple messaging system instances to allow for high-performance, high-availability, and scalability in exchanging messages by distributing connection information in publish/subscribe channels accessible by each messaging system instance. By using websocket connections, the system may allow for full duplex communications between server and client systems in bi-directional communication channels. The system may also allow for low latency with persistent connections with minimal network overhead. Furthermore, the infrastructure may support a variety of standard protocols without the use of special firewalls, network, or VPN configurations to support messaging.

Each instance of the messaging system can be started and initialized. During the initialization process, each messaging system instance may register itself in a publish/subscribe channel accessible to all other instances. The registration may allow for response messages originating from the on-premise connector endpoint to be routed to the proper messaging system instance.

Each on-premise connector initializes itself by issuing a websocket connection request to the messaging system. With the initialization of an on-premise connector endpoint, a new websocket connection may be established with a server-side messaging service system.

The messaging system, upon receipt of a websocket connection request from the on-premise connector endpoint, may route the websocket connection request to one of the available messaging system instances.

Once received, the messaging system instance may establish a websocket connection with the on-premise connector endpoint. In some embodiments, the messaging system instance may establish the websocket connection by creating an internal connection identifier for future reference. The messaging system instance may then store the websocket handler in memory. The websocket handler may include a key with the connection identifier and a value of the websocket handler and connection metadata. The messaging system instance may create a listener registry entry in a cache storage. The creation of the listener registry entry may indicate that the corresponding on-premise connector endpoint has an active websocket connection and that the connection identifier is assigned to the current instance. The messaging system instance may then create a subscription in the publish/subscribe channel with the connection identifier to allow accessibility to other instances in the messaging system. The messaging system instance may start a listener to detect incoming messages.

When a message to be transmitted to the on-premise connector endpoint is received, the messaging system may forward the message request to one of the maintained messaging system instances. The messaging system instance may then query the listener registry to identify whether there is a connection available for the target on-premise connector endpoint. The messaging system instance may retrieve the connection identifier from the listener registry. Having obtained the connection identifier, the messaging system instance may determine whether the connection is assigned to the current messaging system instance. If the connection is not assigned to the current messaging system instance, the messaging system instance may publish the message to the publish/subscribe channel for distribution to the other messaging system instances. Using the publication of the message, the messaging system instance to which the connection is assigned may be identified.

Once the current messaging system instance assigned to the websocket connection is identified, the messaging system instance may proceed to process the message. The messaging system instance may assign a message identifier for the received message. To process the message, the messaging system instance may then instantiate a new pending response task and may store the task with the message identifier. The messaging system instance may transmit the response message via the websocket connection to the on-premise connector endpoint. Subsequently, the messaging system instance may receive a response message from the on-premise connector endpoint. In response, the messaging system instance may complete and may terminate the pending task, and the response from the on-premise connector endpoint may be returned to the messaging system.

On the other hand, when a message from the on-premise connector endpoint is received, the messaging system instance may determine whether the message originated from current messaging system instance. If the sender of the message is the current messaging system instance, the messaging system instance may process the message. In processing the message, the messaging system instance may instantiate a new pending response task and may store the task with the message identifier. The messaging system instance may transmit the response message via the websocket connection to the on-premise connector endpoint. The messaging system instance may then complete and may terminate the pending task, and the response from the on-premise connector endpoint may be returned to the messaging system. In contrast, if the sender of the message is another instance, the messaging system instance may publish the message to the publish/subscribe channel for distribution to the other messaging system instances. Using the publication of the message, the messaging system instance to which the connection is assigned may be identified. The identifier instance may then send the message to the on-premise connector end point via the corresponding websocket connection.

In addition, the infrastructure may, in addition or as an alternative, provide for communication via queue services, in which message requests and responses may be exchanged via incoming and outgoing queues. With the use of an endpoint and instance registry, a state of each messaging system instance may be stored to identify the proper connection handler to forward the message. Moreover, the messaging system may store payload for large, overflow messages in a storage. The infrastructure may also allow for long live connections by managing such connections using a websocket pool. Furthermore, the infrastructure may allow for multiple tenants at the on-premise center to communicate messages.

For outgoing flow, the messaging system may maintain a queue of requests for communicating to a specific endpoint. The messaging system may receive a request and may identify a connection handler instance containing a direct websocket connection with the specified endpoint by accessing the cache storage. An instance of a messaging application interface (e.g., RESTful API) may submit a message to the identified connection handler instance via a service bus. Once a new message is received from the outgoing flow queue, the connection handler may then obtain a connection to the target connector endpoint. When the connection becomes available, the message may then be forwarded to the target endpoint.

In contrast, for incoming flow, the target endpoint may send a reply back to the connection handler via an establish connection. The connection handler may then forward the response to the request originator. Once a new message is received from the ingoing flow queue, the connection handler may reply to the messaging system by identifying the respective request from which the response originated.

To handle websocket connections, an endpoint may indicate that the endpoint is available for communications by requesting to establish a websocket connection with the messaging system. With completion of the handshake, a messaging system instance may be included in a connection pool for the endpoint for incoming requests for communication. In addition, the connection handler may use consumer/producer pattern to synchronize access for endpoint connections. To this end, the connection handler may consume a connection from the connection pool and may wait until another connection becomes available for a specific endpoint. The connection handler may also produce a connection in the connection pool, subsequent to completion of transmission of a message or when a new connection from the endpoint is established.

At least one aspect of this disclosure is directed to a system for providing messages via websocket connections. A messaging system may include a plurality of messaging system instances. The messaging system may maintain, on a first network, via the plurality of messaging system instances of the messaging system, a plurality of persistent websocket connections between each of a plurality of on-premise connectors and each of the plurality of messaging system instances. The messaging system may receive a message to be sent to an endpoint on a second network of an on-premise connector of the plurality of on-premise connectors. The messaging system may identify, via a registry associating on-premise connector endpoints to messaging instances, a messaging system instance of the plurality of messaging system instances via which to send the message to the endpoint. The messaging system instance may maintain the websocket connection to the on-premise connector in communication with the endpoint. The messaging system instance may transmit the message to the endpoint via the websocket connection to the on-premise connector.

In some embodiments, the messaging instance may establish the websocket connection with the on-premise connector. In some embodiments, the messaging instance may create a subscription in a publish/subscribe channel. The subscription may identify a connection identifier identifying the websocket connection.

In some embodiments, the messaging system may submit the message to a candidate messaging system instance. In some embodiments, the candidate messaging system instance may determine that there is an available websocket connection to the on-premise connector. In some embodiments, the candidate messaging system instance may identify that the messaging system instance that established the websocket connection is the candidate messaging system instance.

In some embodiments, the messaging system may submit the message to a candidate messaging system instance. In some embodiments, the candidate messaging system instance may determine that there is a websocket connection available for the endpoint of the on-premise connector. In some embodiments, the candidate messaging system instance may determine that the messaging system instance that established the websocket connection is not the candidate messaging system. In some embodiments, the candidate messaging system instance may publish the message to a publish/subscribe channel identifying a connection identifier of the websocket connection.

In some embodiments, the messaging system instance may determine that the message published in the publish/subscribe channel identifies the connection identifier of the websocket connection that was established by the messaging system instance. In some embodiments, the messaging system instance may receive the message via the publish/subscribe channel to transmit to the endpoint of the on-premise connector.

In some embodiments, the message may be a first message. In some embodiments, the messaging system instance may receive a second message from the endpoint of the on-premise connector. The second message may be responsive to the first message. In some embodiments, the messaging system instance may transmit the second message to a caller that originated the first message.

In some embodiments, the message may be a first message. In some embodiments, the messaging system instance may be the first messaging system instance. In some embodiments, a second messaging system instance of the plurality of messaging system instances may receive a second message from the endpoint of the on-premise connector. The second message may be responsive to the first message. In some embodiments, the second messaging system instance may publish the second message to a publish/subscribe channel. In some embodiments, the first messaging instance may receive the second message from the publish/subscribe channel. In some embodiments, the first messaging instance may transmit the second message to a caller that originated the first message.

In some embodiments, the registry may include a plurality of entries. Each entry of the entries may pair a respective websocket connection to i) a respective messaging system instance that established the respective websocket connection, or ii) a listener specific to a respective endpoint of the on-premise connector. The listener may be established by the messaging system instance that established the respective websocket connection.

In some embodiments, to identify the messaging system instance of the messaging system that established the websocket connection to the endpoint of the on-premise connector to which the message is to be forwarded, the messaging system may identify the on-premise connector to which to transmit the message. In some embodiments, the messaging system may identify a messaging system instance that has one or more websocket connections established with the on-premise connector.

In some embodiments, the messaging system may store the message in a queue of the messaging system instance. In some embodiments, the messaging system instance may retrieve the message from the queue. In some embodiments, the messaging system instance may identify, prior to transmitting the message via the websocket connection to the endpoint, an available websocket connection from a pool of websocket connections established with the endpoint of the on-premise connector.

Another aspect of this disclosure is directed to a method of providing messages via websocket connections. A messaging system may maintain, on a first network, via the plurality of messaging system instances of the messaging system, a plurality of persistent websocket connections between each of a plurality of on-premise connectors and each of the plurality of messaging system instances. The messaging system may receive a message to be sent to an endpoint on a second network of an on-premise connector of the plurality of on-premise connectors. The messaging system may identify, via a registry associating on-premise connector endpoints to messaging instances, a messaging system instance of the plurality of messaging system instances via which to send the message to the endpoint. The messaging system instance may maintain the websocket connection to the on-premise connector in communication with the endpoint. The messaging system instance may transmit the message to the endpoint via the websocket connection to the on-premise connector.

In some embodiments, the messaging system instance may establish the websocket connection to the on-premise connector. In some embodiments, establishing the websocket connection may include creating a subscription in a publish/subscribe channel. The subscription identifying a connection identifier may identify the websocket connection.

In some embodiments, identifying the messaging system instance of the messaging system that established the websocket connection to the on-premise connector may include submitting the message to a candidate messaging system instance. In some embodiments, identifying the messaging system instance of the messaging system that established the websocket connection to the on-premise connector may include determining, by the candidate messaging system instance, that there is an available websocket connection to the on-premise connector. In some embodiments, the candidate messaging system instance may identify that the messaging system instance that established the websocket connection is the candidate messaging system instance.

In some embodiments, identifying, the messaging system instance of the messaging system that established the websocket connection to the endpoint of the on-premise connector to which the message is to be forwarded may include submitting the message to a candidate messaging system instance. The candidate messaging system instance may determine that there is a websocket connection available for the endpoint of the on-premise connector. The candidate messaging system instance may determine that the messaging system instance that established the websocket connection is not the candidate messaging system. The candidate messaging system instance may publish the message to a publish/subscribe channel identifying a connection identifier of the websocket connection.

In some embodiments, the messaging system instance may determine that the message published in the publish/subscribe channel identifies the connection identifier of the websocket connection that was established by the messaging system instance. In some embodiments, the messaging system instance may receive the message via the publish/subscribe channel to transmit to the endpoint of the on-premise connector.

In some embodiments, the message may be a first message. A second messaging system instance may receive a second message from the endpoint of the on-premise connector. The second message may be responsive to the first message. In some embodiments, the second messaging instance may publish the second message to a publish/subscribe channel. In some embodiments, the messaging system instance may receive the second message from the publish/subscribe channel. In some embodiments, the messaging system instance may transmit the second message to a caller that originated the first message.

In some embodiments, the registry may include a plurality of entries. Each entry of the entries may pair a respective websocket connection to i) a respective messaging system instance that established the respective websocket connection, or ii) a listener specific to a respective endpoint of the on-premise connector. The listener may be established by the messaging system instance that established the respective websocket connection.

In some embodiments, identifying a messaging system instance of the messaging system that established the websocket connection to the endpoint of the on-premise connector to which the message is to be forwarded may include identifying the on-premise connector to which to transmit the message. In some embodiments, identifying a messaging system instance of the messaging system that established the websocket connection to the endpoint of the on-premise connector to which the message is to be forwarded may include identifying a messaging system instance that has one or more websocket connections established with the on-premise connector.

In some embodiments, the messaging system may store the message in a queue of the messaging system instance. In some embodiments, the messaging system may retrieve the message from the queue. In some embodiments, the messaging system may identify, prior to transmitting the message via the websocket connection to the endpoint, by the messaging system instance, an available websocket connection from a pool of websocket connections established with the endpoint of the on-premise connector.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
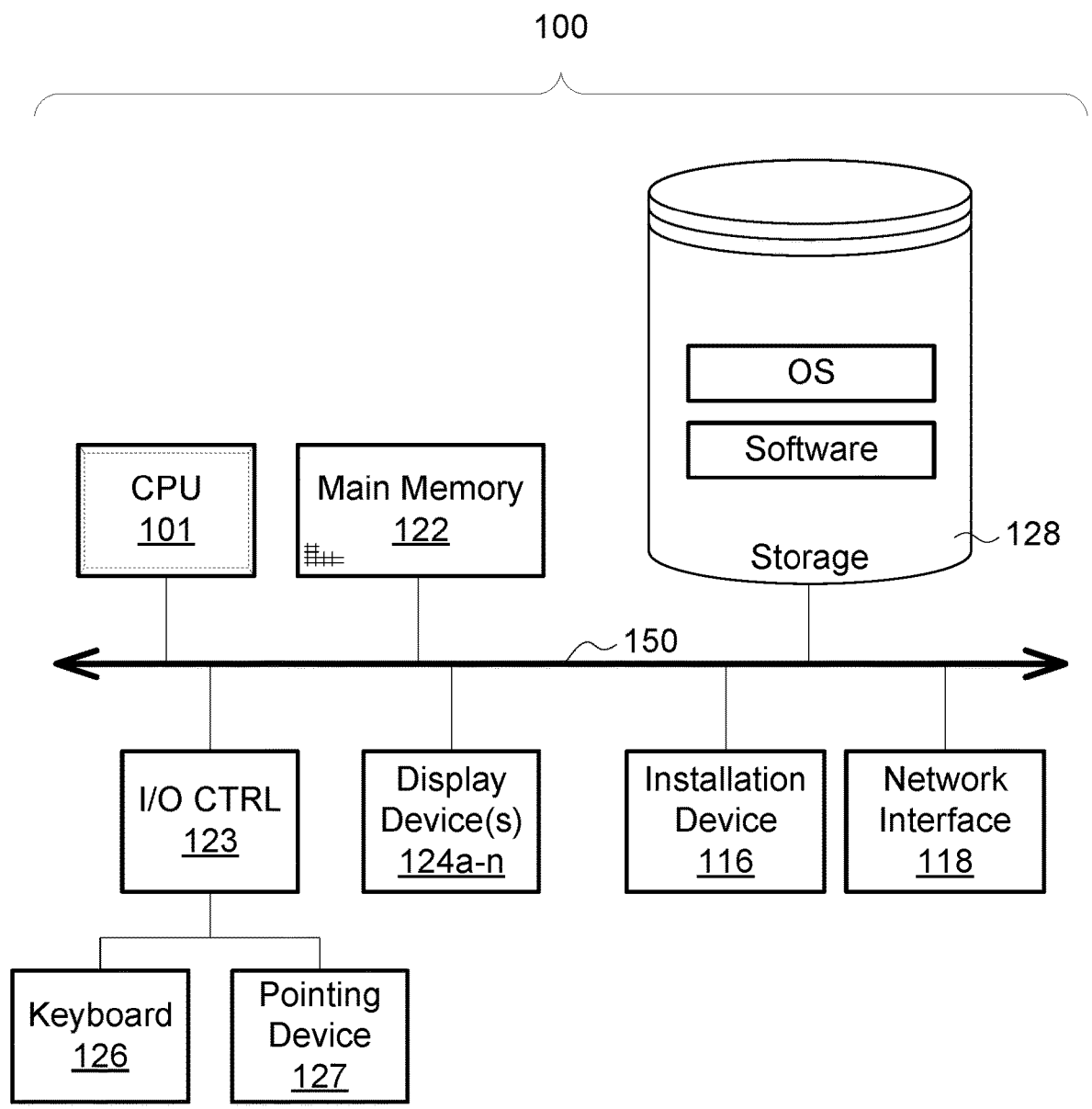
FIGS. 1A-1D are block diagrams of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for providing messages via websocket connections.

A. Computing Environment

Figure 1B:
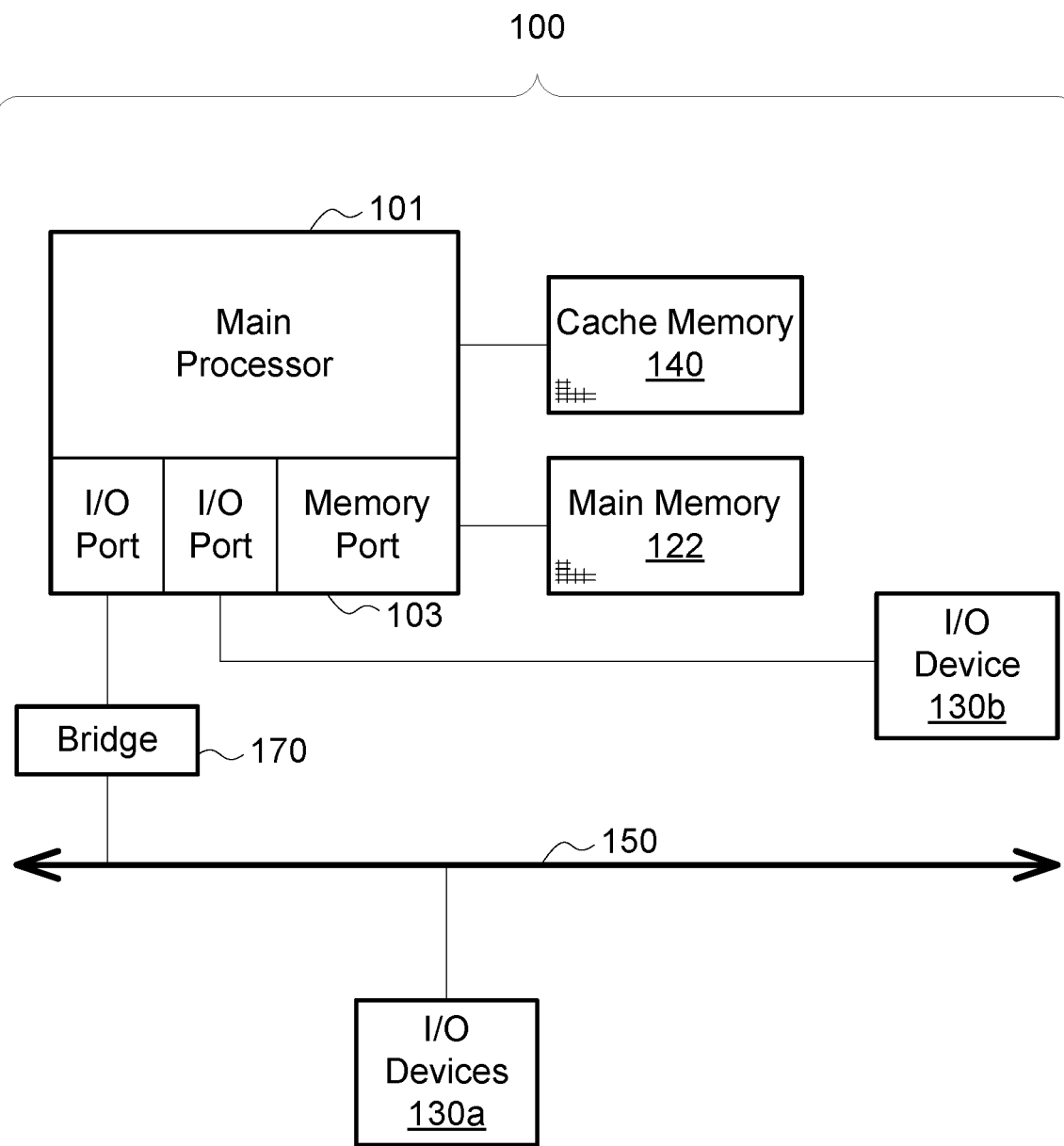

Prior to discussing the specifics of embodiments of the systems and methods of an appliance and/or client, it may be helpful to discuss the computing environments in which such embodiments may be deployed. FIGS. 1A and 1B depict block diagrams of a computing device 100 useful for practicing embodiments of the systems and devices described further below in Section B. As shown in FIGS. 1A and 1B, each computing device 100 includes a central processing unit 101, and a main memory unit 122. As shown in FIG. 1A, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Samsung Electronics of Suwon, Korea; those manufactured by Micron Technology of Boise, Id.; those manufactured by Transmeta Corporation of Santa Clara, Calif.; those manufactured by International Business Machines of White Plains, N.Y.; or those manufactured by Advanced Micro Devices of Sunnyvale, Calif., among others. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1A, the processor 101 communicates with main memory 122 via a system bus 150 (described in more detail below). FIG. 1B depicts an embodiment of a computing device 100 in which the processor communicates directly with main memory 122 via a memory port 103. For example, in FIG. 1B the main memory 122 may be DRDRAM.

FIG. 1B depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1B, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1B depicts an embodiment of a computer 100 in which the main processor 101 communicates directly with I/O device 130b via HyperTransport, Rapid I/O, or InfiniBand. FIG. 1B also depicts an embodiment in which local busses and direct communication are mixed: the processor 101 communicates with I/O device 130b using a local interconnect bus while communicating with I/O device 130a directly.

The computing device 100 may support any suitable installation device 116, such as a CD-ROM drive, a CD-R/RW drive, a DVD-ROM drive, tape drives of various formats, USB device, hard-drive or any other device suitable for installing software and programs. The computing device 100 may further comprise a storage device 128, such as one or more hard disk drives or redundant arrays of independent disks, for storing an operating system and other related software, and for storing application software programs. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1A. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif. or SanDisk Corporation of Milpitas, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1A and 1B typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, and WINDOWS 10, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a UNIX operating system, among others.

In other embodiments, the computing device 100 may have different processors, operating systems, and input devices consistent with the device. For example, in one embodiment the computer 100 may be a smartphone or a tablet, such as those developed by Apple Inc., by Samsung Electronics, by Xiaomi. Inc., or by Google Inc., among others. In this embodiment, the smartphone or tablet may be operated under the control of an operating system (such as Android or iOS) and may include a stylus input device as well as a touch sensitive screen. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1C:
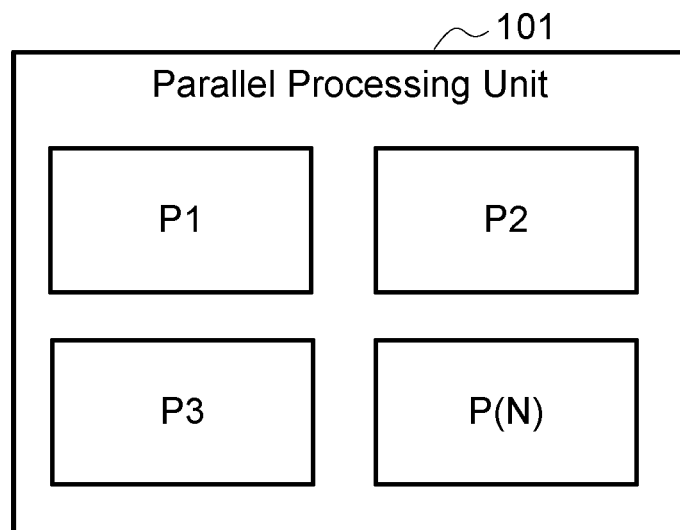

As shown in FIG. 1C, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a Cell Broadband Engine architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1D:
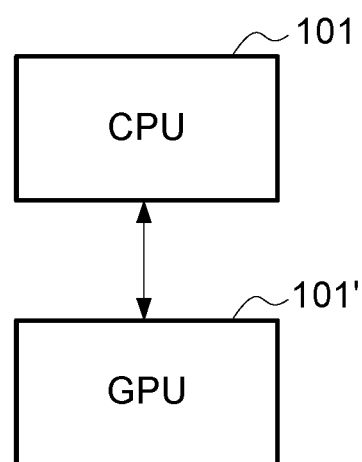

In some embodiments, the computing device 100 may comprise a graphics processing unit. In one of these embodiments depicted in FIG. 1D, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Providing Messages Via Websocket Connections

This disclosure describes patterns that can be used for providing messages via websocket connections. The present systems and methods may provide an infrastructure for server-side systems and on-premise connectors to communicate. The server-side system may run multiple messaging system instances to allow for high-performance, high-availability, and scalability in exchanging messages by distributing connection information in publish/subscribe channels accessible by each messaging system instance. Websocket may be a computer network communications protocol that may provide full-duplex communication channels over a single Transmission Control Protocol (TCP) connection between multiple devices. To establish a websocket connection, a client may send a handshake request to a server (e.g., on a cloud computing system). The server may return a handshake response in turn. The handshake may resemble HTTP in allowing the client and the server to handle HTTP connections and websocket connections on the same network port. Once the websocket connection is established, the client and the server may communicate using a bidirectional binary protocol. The client and server can also exchange websocket data or text frames in full-duplex mode.

Each instance of the messaging system can be started and initialized. During the initialization process, each messaging system instance may register itself in a publish/subscribe channel accessible to all other instances. The registration may allow for response messages originating from the on-premise connector endpoint to be routed to the proper messaging system instance.

Each on-premise connector initializes itself by issuing a websocket connection request to the messaging system. With the initialization of an on-premise connector endpoint, a new websocket connection may be established with a server-side messaging service system.

The messaging system, upon receipt of a websocket connection request from the on-premise connector endpoint, may route the websocket connection request to one of the available messaging system instances.

Once received, the messaging system instance may establish a websocket connection with the on-premise connector endpoint. In some embodiments, the messaging system instance may establish the websocket connection by creating an internal connection identifier for future reference. The messaging system instance may then store the websocket handler in memory. The websocket handler may include a key with the connection identifier and a value of the websocket handler and connection metadata. The messaging system instance may create a listener registry entry in a cache storage. The creation of the listener registry entry may indicate that the corresponding on-premise connector endpoint has an active websocket connection and that the connection identifier is assigned to the current instance. The messaging system instance may then create a subscription in the publish/subscribe channel with the connection identifier to allow accessibility to other instances in the messaging system. The messaging system instance may start a listener to detect incoming messages.

When a message to be transmitted to the on-premise connector endpoint is received, the messaging system may forward the message request to one of the messaging system instances. The messaging system instance may then query the listener registry to identify whether there is a websocket connection available for the target on-premise connector endpoint. The messaging system instance may retrieve the connection identifier from the listener registry. Having obtained the connection identifier, the messaging system instance may determine whether the connection is assigned to the current messaging system instance. If the connection is not assigned to the current messaging system instance, the messaging system instance may publish the message to the publish/subscribe channel for distribution to the other messaging system instances. Using the publication of the message, the messaging system instance to which the connection is assigned may be identified.

Once the current messaging system instance assigned to the connection is identified, the messaging system instance may proceed to process the message. The messaging system instance may assign a message identifier for the received message. To process the message, the messaging system instance may then instantiate a new pending response task and may store the task with the message identifier. The messaging system instance may transmit the response message via the websocket connection to the on-premise connector endpoint. Subsequently, the messaging system instance may receive a response message from the on-premise connector endpoint. In response, the messaging system instance may complete and may terminate the pending task, and the response from the on-premise connector endpoint may be returned to the messaging system.

On the other hand, when a message from the on-premise connector endpoint is received, the messaging system instance may determine whether the message originated from current instance. If the sender of the message is the current instance, the messaging system instance may process the message. In processing the message, the messaging system instance may instantiate a new pending response task and may store the task with the message identifier. The messaging system instance may transmit the response message via the websocket connection to the on-premise connector endpoint. The messaging system instance may then complete and may terminate the pending task, and the response from the on-premise connector endpoint may be returned to the messaging system. In contrast, if the sender of the message is another instance, the messaging system instance may publish the message to the publish/subscribe channel for distribution to the other messaging system instances. Using the publication of the message, the messaging system instance to which the connection is assigned may be identified. The messaging system instance may then send the message to the on-premise connector end point via the corresponding websocket connection.

Figure 2A:
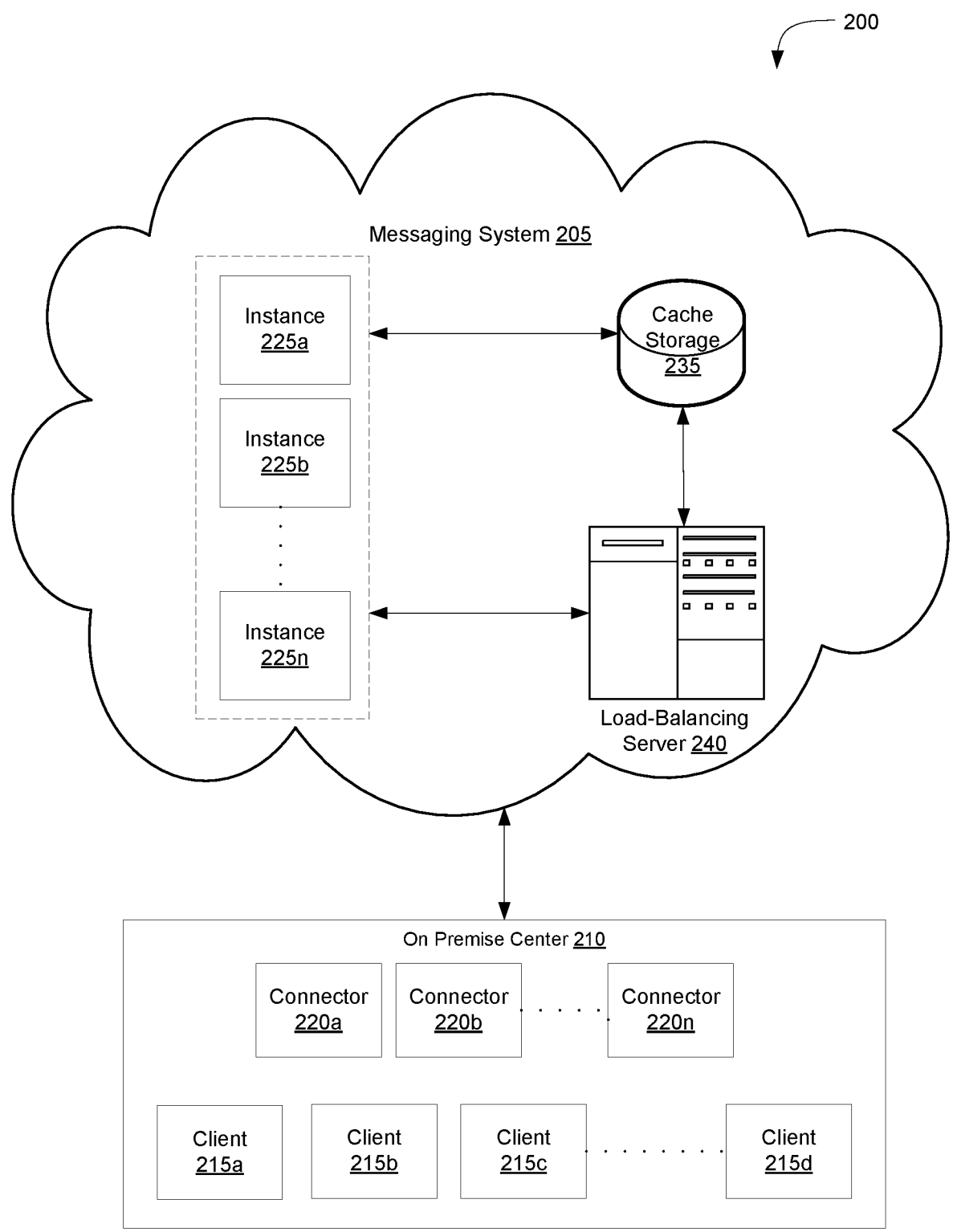
FIG. 2A is a block diagram of an embodiment of a system for providing messages via websocket connections.

Referring now to FIG. 2A, depicted is a block diagram of an embodiment of a system 200 for providing messages via websocket connections. In brief summary, the system 200 may include a messaging system 205 and an on-premise center 210. The messaging system 205 may be cloud computing system operating using one or more communication networks. The messaging system 205 may include one or more messaging system instances 225a-n, a cache storage 235, and a load-balancing server 240. The on-premise center 210 may include one or more on-premise connectors 220a-n and one or more clients 215a-n. Each of the above-mentioned elements or entities is implemented in hardware, or a combination of hardware and software, in one or more embodiments. Each component of the system 200 may be implemented using hardware or a combination of hardware or software detailed above in connection with FIGS. 1A-1D. For instance, each of these elements or entities can include any application, program, library, script, task, service, process or any type and form of executable instructions executing on hardware of the messaging system 205 and the on-premise center 210. The hardware includes circuitry such as one or more processors in one or more embodiments.

In further detail, the load-balancing server 240 of the messaging system 205 may manage communications between the messaging system 205 and the on-premise center 210. The load-balancing server 240 of the messaging system 205 may maintain, monitor, access or communicate with a plurality of messaging system instances 225a-n. Each messaging system instance 225a-n may be used to maintain persistent websocket connections between the one or more connectors 220a-n of the on-premise center 210 via which one or more of the plurality of client 215a-n. In some embodiments, the messaging system instances 225a-n may be initialized on a server operating on a first communication network, such as a cloud based network 205. Each connector 225a-n may be used to manage communications for a subset of clients 215a-n (in some instances, the clients may be users, tenants, or other entities) at the on-premise center 210. There may be multiple subsets of clients 215a-n at the on-premise center 210 served by the plurality of connectors 220a-n. In some embodiments, there may be a separate network between the plurality of connectors 220a-n and endpoints (e.g., one or more entities, such as clients 215a-n) at the on-premise center 210.

Figure 2B:
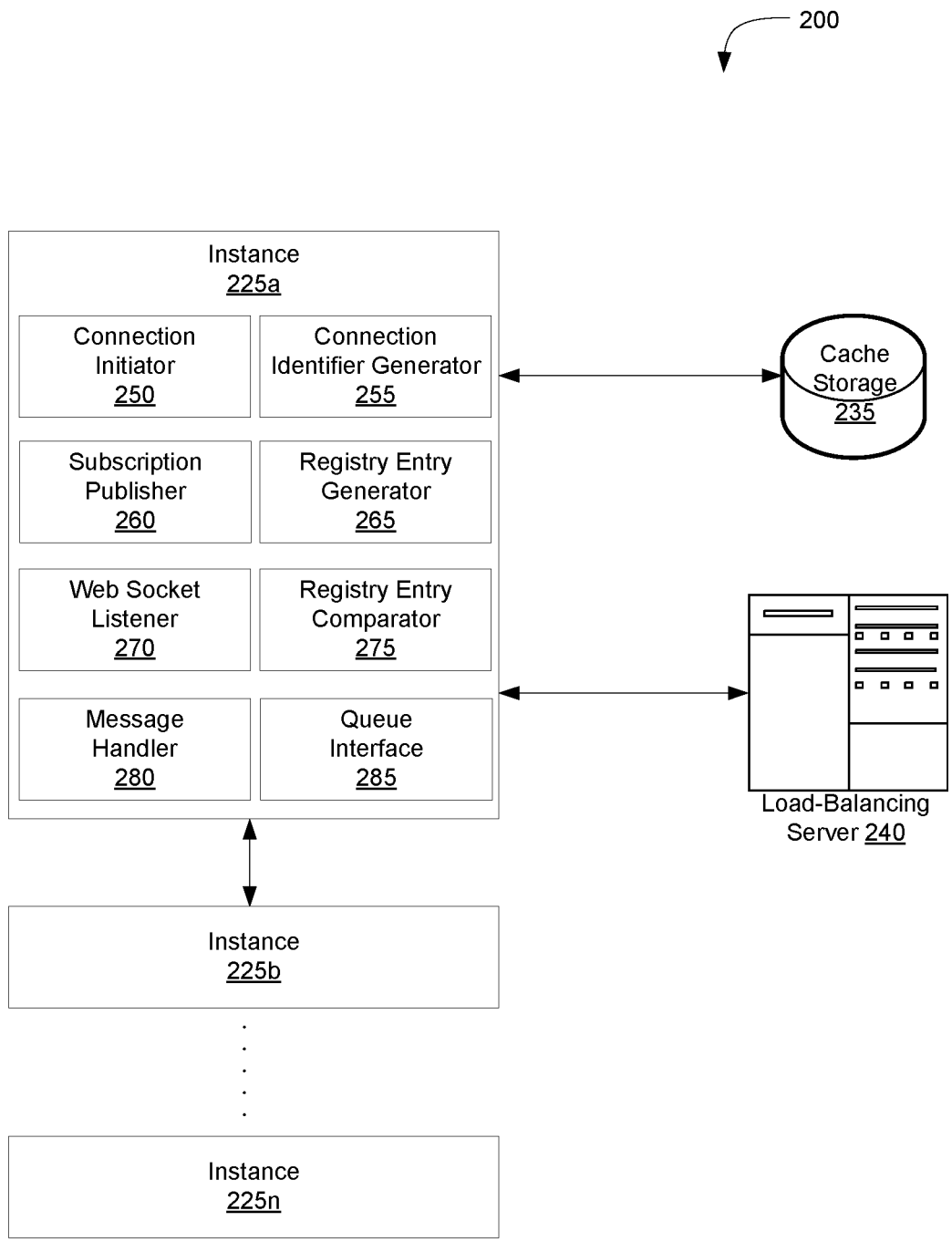
FIG. 2B is a block diagram of an embodiment of a message system instance for a system for providing messages via socket connections

Referring now to FIG. 2B, depicted is block diagram of an embodiment of one of the instances 225a for the system 200 for providing messages via websocket connections. The instance 225a may include a connection initiator 250, a connection identifier generator 255, a registry entry generator 260, a subscription publisher 265, a websocket listener 270, a registry entry comparator 275, a message handler 280, and a queue interface 285, among other. All of the other instances 225b-n may have the instantiations of the same components as the instance 225a. Each component of instance 225a is implemented in hardware, or a combination of hardware and software, in one or more embodiments Each messaging system instance 225a-n may be initialized by the messaging system 205 (e.g., the load-balancing server 240 or another device connected to the cloud-based network of the messaging system 205). Upon initialization, the connection initiator 250 may establish a websocket connection with one of the connectors 220a-n at the on-premise center 210. The websocket connection may be in accordance with the websocket protocol that may provide full-duplex communication channels over a single Transmission Control Protocol (TCP) connection between multiple devices. During the initialization process, the connection initiator 250 of each messaging system instance may register the corresponding instance 225a-n in a publish/subscribe channel accessible to all other instances 225a-n. In some embodiments, the registration may include an instance identifier for storage in the publish/subscribe channel. The registration may allow for response messages originating from the connector 220a-n to be routed to the proper messaging system instance 225a-n. To establish a websocket connection, the connection initiator 250 may receive a handshake request from one of the connectors 220a-n and may perform a handshake process with the connector 220a-n. Once the websocket connection is established, the instance 225a-n may communicate using a bidirectional binary protocol with the connector 220a-n.

The connection identifier generator 255 of the messaging system instance 225a-n may generate the connection identifier for the persistent websocket connection between the respective connector 220a-n and the messaging system 205. The connection identifier may be a numeric or alphanumeric value used to uniquely identify the websocket connection between the connector 220a-n and the messaging system 205, and may be generated based on a messaging system instance identifier corresponding to the respective messaging system instance 225a-n. Using the connection identifier, the connection identifier generator 255 of each messaging system instance 225a-n may add the connection between the connector 220a-n and the messaging system instance 225 to a database at the load-balancing server 240 or the cache storage 235 or some other entity of the messaging system 205.

The subscription publisher 260 of each messaging system instance 225a-n may also create a subscription in the publish/subscribe channel with the connection identifier. In some embodiments, the publish/subscribe channel may be maintained in the cache storage 235 or at the load-balancing server 240. The subscription may include the connection identifier for the websocket connection between the respective connector 220a-n of the on-premise center 210 and the messaging system 205. The subscription may be accessible by the subscription publishers 260 of other messaging system instances 225a-n and may specify to which instance 225a-n to forward future communications. Examples of subscriptions may include:

| Instance | Connections |
|---|---|
| messaging:instance:instanceA:conn | {532A0E99-8D47-449E-8104-09E978BA2XXX}, {777B0E71-8D47-449E-8104- |

-continued

| Instance | Connections |
|---|---|
| messaging:instance:instanceB:conn | 09E978BA2ZZZ},<br>{293C0E33-8D47-449E-8104-09E978BA2YYY}<br>{333Z0E98-8D47-449E-8104-09E978BA2FEB} |

To manage the persistent websocket connection, the registry entry generator 265 of each messaging system instance 225a-n may create a listener registry entry in a registry maintained at the cache storage 235. The listener registry entry may include the connection identifier, websocket handler, and connection metadata, among others. The listener registry entry may identify the connector 220a-n at the on-premise center 210. In some embodiments, the listener registry entry may include a pairing of the persistent websocket connection to a listener specific to the endpoint (e.g., one or more clients 215a-n) of the respective connector 220a-n. The creation of the listener registry entry may indicate that the corresponding on-premise connector endpoint has an active websocket connection and that the connection identifier is assigned to the current instance.

In some embodiments, the listener registry entry may include a pairing of the persistent websocket connection to the respective messaging system instance 225a-n. The listener registry entry may indicate that the persistent websocket connection is assigned to the respective messaging system instance 225a-n. Examples of listener registry entries may include:

| Listener | Connections |
|---|---|
| messaging:listen:hulk:endpoint1 | {532A0E99-8D47-449E-8104-09E978BA2XXX},<br>{777B0E71-8D47-449E-8104-09E978BA2ZZZ} |
| messaging:listen:capamerica:endpoint1 | {333Z0E98-8D47-449E-8104-09E978BA2FEB},<br>{293C0E33-8D47-449E-8104-09E978BA2YYY} |

The instance 225a-n may also establish the websocket listener 270 for the persistent websocket connection. The websocket listener 270 may detect incoming communication for the persistent connection. Subsequently, the messaging system 205 may receive a message to be sent from the messaging system 205 to the on-premise center 210. The message may be directed to an endpoint (e.g., one or more clients 215a-n) on another network of the connectors 220a-n. In some embodiments, the message may include a source endpoint (e.g., one of the clients 215a-n), a destination endpoint (e.g., one or more other clients 215a-n), and a message body, among others. In some embodiments, the websocket listener 270 of one of the instances 225a-n may detect the incoming message to be sent to the connector 220a-n of the on-premise center 210.

Upon receipt of the message, the load-balancing server 240 may identify via the listener registry a candidate messaging system instance 225a-n to which to direct the message to. Responsive to the identification, the load-balancing server 240 may forward or submit the message to the candidate messaging system instance 225a-n. The candidate messaging system instance 225a-n may be different from the one that originally established the websocket connection for the connector 220a-n serving the endpoint indicated by the message.

Upon receipt, the registry entry comparator 275 of the candidate messaging system instance 225a-n may determine there is an available websocket connection to the respective connector 220a-n for the endpoint indicated by the message. If there is an available websocket connection, the registry entry comparator 275 of the candidate messaging system instance 225a-n may determine whether the candidate messaging system instance 225a-n is the messaging system instance 225a-n that established the websocket connection. In some embodiments, the registry entry comparator 275 of the candidate messaging system instance 225a-n may access the registry at the load-balancing server 240 or the cache storage 235 to identify the listener registry entry. In some embodiments, the registry entry comparator 275 of the candidate messaging system instance 225a-n may determine whether the candidate messaging system instance 225a-n is the one that established the websocket connection from the listener registry entry by identifying whether the connection to the end point for the connector 220a-n is assigned to the candidate messaging system instance 225a-n. In some embodiments, the identification may be performed using the connection identifier indicated in the listener registry entry. In some embodiments, the registry entry comparator 275 of the candidate messaging system instance 225a-n may compare the websocket identifier associated with the connection identifier with the websocket identifier corresponding to the candidate messaging system instance 225a-n to determine whether there is a match. If the websocket connection is assigned to the candidate messaging system instance 225a-n, the registry entry comparator 275 of the candidate messaging system instance 225a-n may determine that the candidate messaging system instance 225a-n is the one that established the websocket connection. In contrast, if the websocket connection is not assigned to the candidate messaging system instance 225a-n, the registry entry comparator 275 of the candidate messaging system instance 225a-n may determine that the candidate messaging system instance 225a-n is not the one that established the websocket connection.

If the candidate messaging system instance 225a-n is not the messaging system instance 225a-n that established the websocket connection, the subscription publisher 260 of the candidate messaging system instance 225a-n may publish or distribute the message onto the publish/subscribe channel maintained by the load-balancing server 240. In some embodiments, the subscription publisher 260 of the candidate messaging system instance 225a-n may extract the connection identifier from the listener registry and may publish the message with the connection identifier. Upon receipt of the message, the load-balancing server 240 (or another device of the messaging system 205) may determine whether the message published in the publish/subscribe channel identifies the connection identifier of the websocket connection for the endpoint of the connector 220a-n. In some embodiments, the load-balancing server 240 may identify the connection identifier from the listener registry. In some embodiments, the load-balancing server 240 may identify another messaging system instance 225a-n to which to forward the message to from the connection identifier with the message. The newly identified messaging system instance 225a-n may be the one that originally established the websocket connection. In some embodiments, the load-balancing server 240 may identify the connector 220a-n to which to send the message. Once identified, the load-balancing server 240 may submit or forward the message to the identified messaging system instance 225a-n that originally established the websocket connection.

Once the websocket 225a-n is newly identified or if the candidate messaging system instance 225a-n is the messaging system instance 225a-n that established the web socket connection, the message handler 280 of the messaging system instance 225a-n may proceed to transmit the message to the connector 220a-n of the endpoint designated by the message via the websocket connection. In this manner, as the messaging system instance 225a-n identified is the one that established the websocket connection, the messaging system 205 may maintain the persistent communications with the connectors 220a-n of the on-premise center 210. The message handler 280 of the messaging system instance 225a-n may assign a message identifier to the message to be sent to the connector 220a-n for the designated end point. The message identifier may be generated by the messaging system instance 225a-n based on the connection identifier, timestamp, source endpoint, and destination endpoint, among others. The message handler 280 of the messaging system instance 225a-n may create a new pending response task for processing and sending the message. The new pending response task may be an asynchronous task. Once created, the message handler 280 of the messaging system instance 225a-n may submit or send the message to the connector 220a-n via the websocket connection. The message handler 280 of the messaging system instance 225a-n may then wait for a reply or a confirmation message from the connector 220a-n via the websocket connection. Once received, the message handler 280 of the messaging system instance 225a-n may terminate or complete the response task. The message handler 280 of the messaging system instance 225a-n may in addition send a callback response to the endpoint (e.g., client 215a-n).

The load-balancing server 214 or one of the messaging system instances 225a-n may also receive another message to be sent from the on-premise center 210. The message may originate from an endpoint (e.g., one or more clients 215a-n) on another network of the connectors 220a-n, and may be directed at one of the messaging system instances 220a-n. In some embodiments, the message may have been sent responsive to a previous message. The message handler 280 of the receiving messaging system instance 225a-n may identify an caller (e.g., one of the messaging system instances 225a-n) that originated the previous message. The message handler 280 of the receiving messaging system instance 225a-n may determine whether the caller of the previous message corresponds to the receiving messaging system instance 225a-n or to another messaging system instance 225a-n. If the caller corresponds to the receiving messaging system instance 225a-n, the message handler 280 of the receiving messaging system instance 225a-n may send the subsequent message to the connector 220a-n via the websocket connection.

On the other hand, if the caller does not correspond to the receiving messaging system instance 225a-n, the message handler 280 of the receiving messaging system instance 225a-n may publish or distribute the message onto the publish/subscribe channel maintained by the load-balancing server 240. In some embodiments, the message handler 280 of the receiving messaging system instance 225a-n may extract the connection identifier from the listener registry and may publish the message with the connection identifier. Upon receipt of the message, the load-balancing server 240 may determine whether the message published in the publish/subscribe channel identifies the connection identifier of the websocket connection for the endpoint of the connector 220a-n. In this manner, the load-balancing server 240 may identify the caller of the previous message. In some embodiments, the load-balancing server 240 may identify the connection identifier from the listener registry. In some embodiments, the load-balancing server 240 may identify another messaging system instance 225a-n to which to forward the message to from the connection identifier with the message. The newly identified messaging system instance 225a-n may be the one that originally established the websocket connection. In some embodiments, the load-balancing server 240 may identify the connector 220a-n to which to send the message. Once identified, the load-balancing server 240 may submit or forward the message to the identified messaging system instance 225a-n that originally established the websocket connection. The message may then be forwarded or submitted to the identified messaging system instance 225a-n.

Figure 3A:
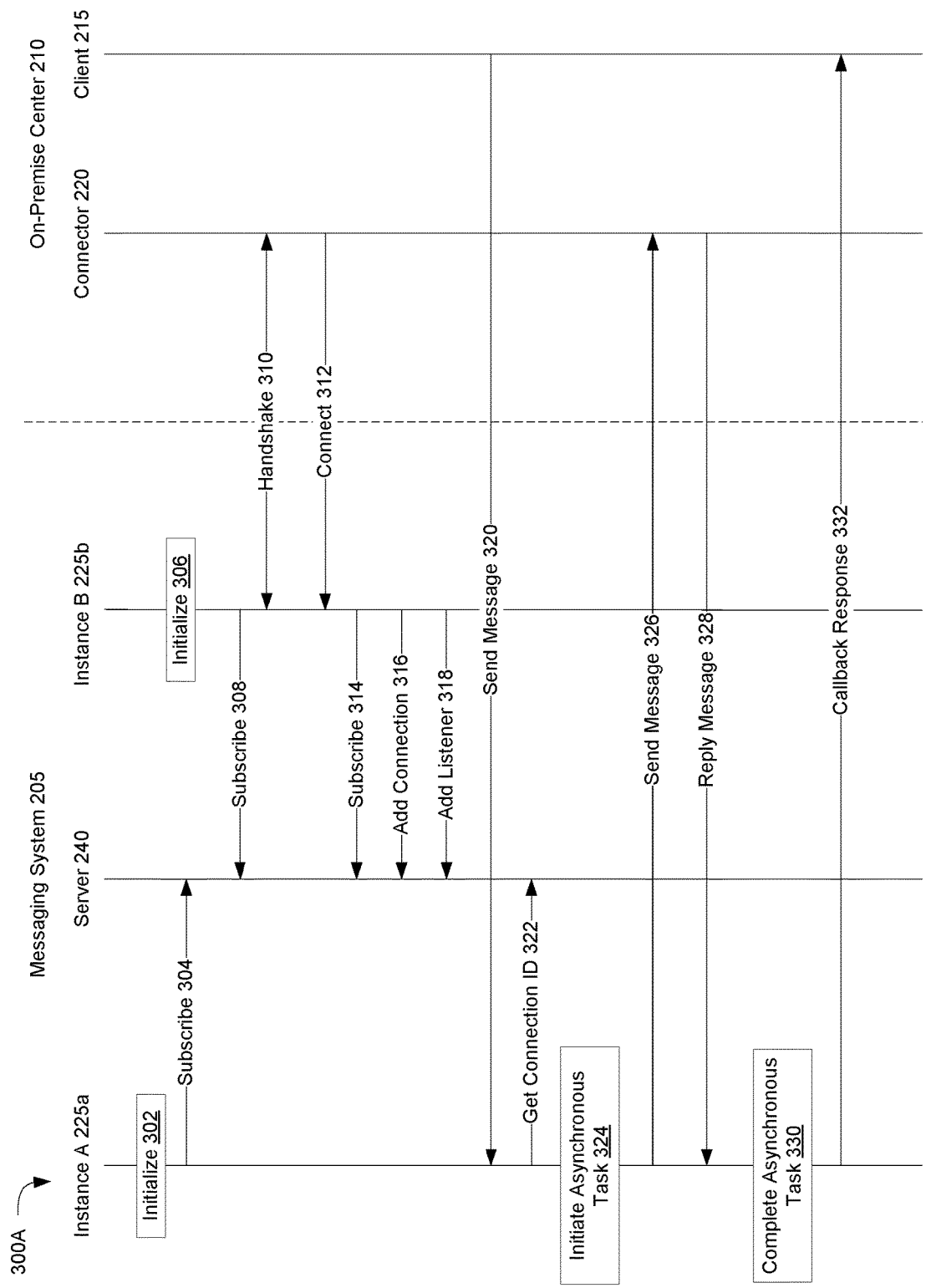
FIGS. 3A-3C are sequence diagrams of an embodiment for a system for providing messages via websocket connections.
Figure 3B:
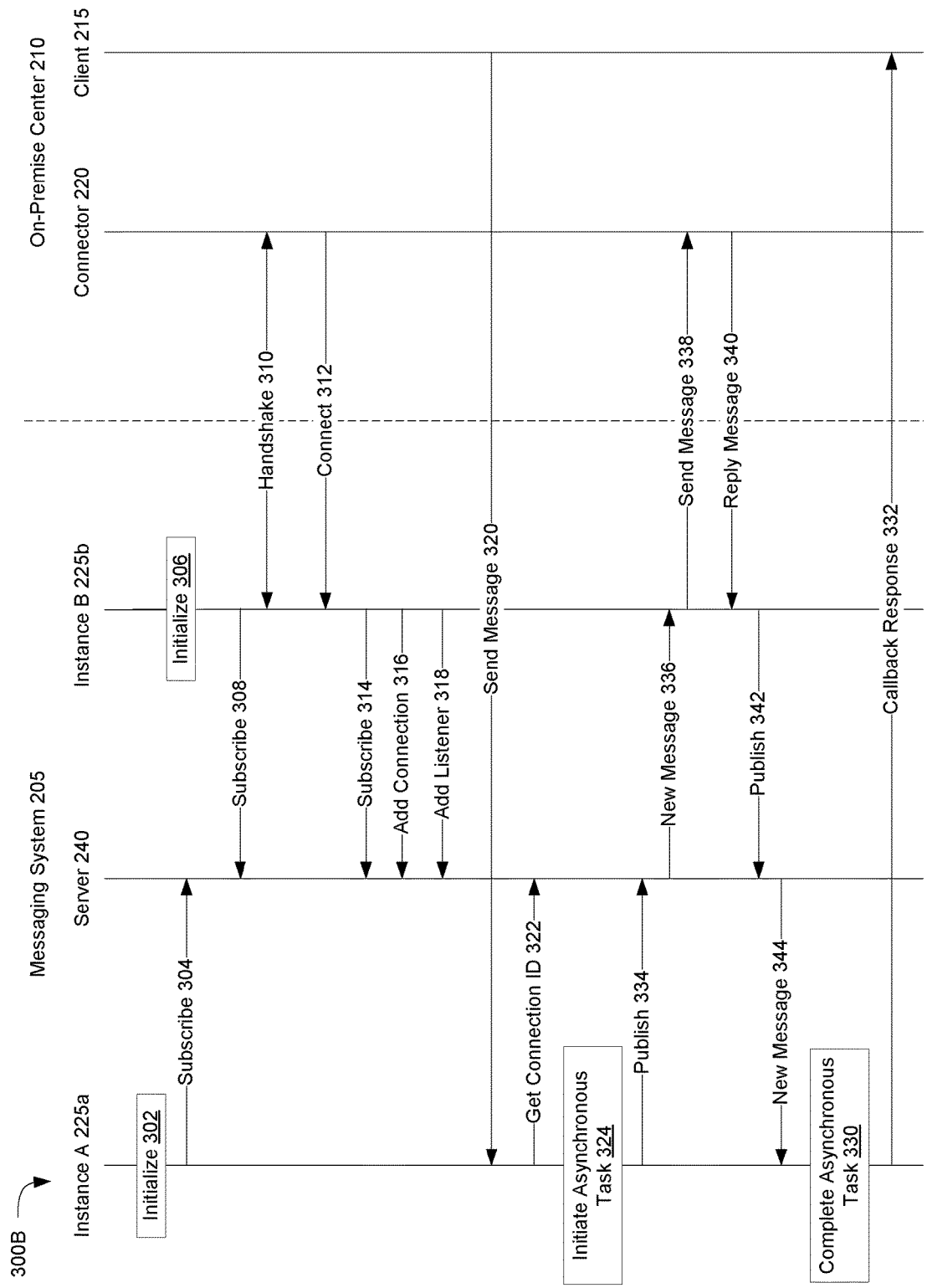
Figure 3C:
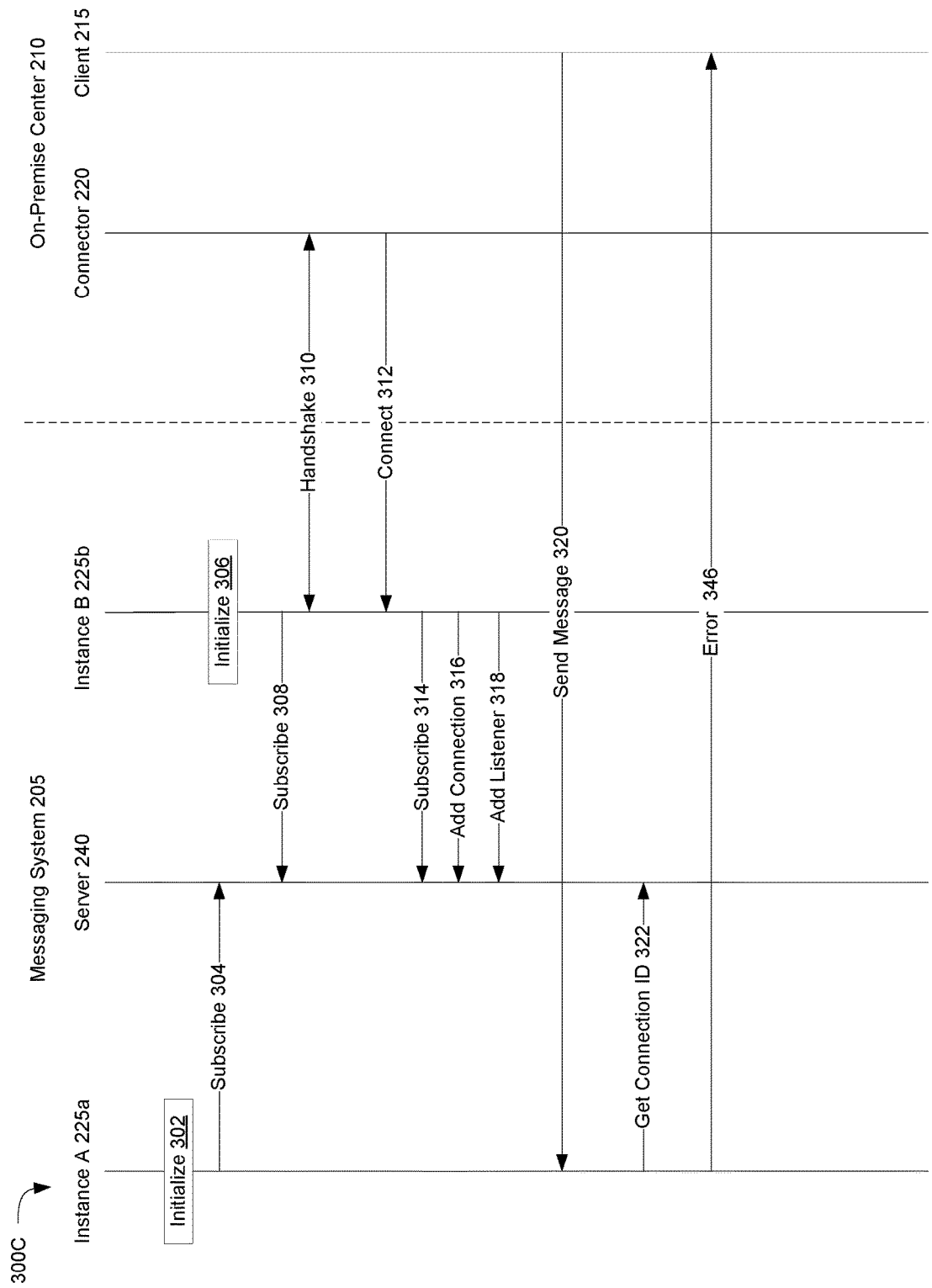

Referring now to FIGS. 3A-3C, depicted are sequence diagrams of an embodiment of a sequence 300A-300C for a system for providing messages via websocket connections. Starting with FIG. 3A, sequence 300A illustrates the scenario in which the first instance 225a is assigned the connection with the connector 220 of the on-premise center 210. In summary, the first instance 225a may initialize (302) and may subscribe itself by sending a message (e.g., "Subscribe(messaging:instance:InstanceA:recv)") to the server 240 (304). The second instance 225b also may initialize (306) and may subscribe itself by sending a message (e.g., "Subscribe(messaging:instance:InstanceB:recv)") to the server 240 (308). The second instance 225b may perform a handshake (310) with the connector 220 of the on-premise center 210.

Once the handshake is complete, the connector 220 may send a message to add the connection (312). Upon receipt, the second instance 225b may send another subscription message with a connection identifier for the connection with the connector 220 (e.g., "Subscribe(messaging: conn: <connectionid123>send')") (314). The second instance 225b may then add the connection to the server 240 by sending another message (e.g., "AddConnection(messaging: instance:<instance B>:conn, connectionid123)") (316). The second instance 225b may also add a listener registry entry to a database maintained at the server 240 by sending yet another message (e.g., "AddListener(Key:messaging:listener <customerid>:<endpoint>, value:<connectionid123>)") (318). Subsequently, the first instance 225a may receive a message (e.g., "SendMessage (Customer, Endpoint, Payload)") from the client 215 at the on-premise center 210 (320). The first instance 225a may then access the server 240 to retrieve the connection identifier (e.g., "GetRandomConnectionId (messaging:listen:<customerId>:<endpoint>)") (322). The first instance 225a may initiate an asynchronous task (324).

If the connection is assigned to the first instance 225a, the first instance 225a may proceed to send the message directly to the connector 220 indicated in the message. The first instance 225a may send the message (e.g., "SendMessage (message)") to the connector 220 at the on-premise center 210 (326). The first instance 225a may in turn receive a reply message from the connector 220 (e.g., "Reply(message)"). Responsive to the receipt, the first instance 225a may terminate or complete the asynchronous task (330), and may send a callback response (e.g., "Callback(response)") to the client 215 (332).

Referring now to FIG. 3B, sequence 300B illustrates the scenario in which the first instance 225a is not assigned the connection with the connector 220 of the on-premise center 210. Sequence 300B differs subsequent to the first instance 225a initiating the asynchronous task (324). If the connection is not assigned to the first instance 225a, the first instance 225a may publish the message to the publish/subscribe channel maintained at the server 240 (e.g., "Publish(messaging:conn:<connectionid123>:send, message)") (334). The server 240 may identify the second instance 225b as having been assigned the connection with the connector 220 of the on-premise center 220. The server 240 may forward the message to the second instance 225b (e.g., "OnNewMessage(messaging:conn:<connectionid123>: send, message)") (336). The second instance 225b may send the message to the connector 220 via the websocket connection previously established (e.g., "SendMessage(message)") (338). The second instance 225b in turn may receive a reply message (e.g., "Reply(message)") (340). The second instance 225b may publish the received reply message onto the publish/subscribe channel maintained at the server 240 (e.g., "Publish(messaging:instance:InstanceA:recv, response)") (342). The server may in turn forward the message to the first instance (e.g., "OnNewMessage(messaging:instance:recv, response)") (344). The remainder of sequence 330B may be similar to sequence 330A.

Referring now to FIG. 3C, sequence 300C illustrates the scenario in which neither the first instance 225a nor the second instance 225b (or any other instance 225c-n) has established a connection with the connector 220 of the on-premise center 210. Subsequent to an attempt to retrieve the connection identifier from the server 240 (322), the first instance 225a may determine that there is no connection identifier for the connection with the connector 220 with any of the messaging system instances 225a-n. Responsive to the determination, the first instance 225a may send an error message to the client 215 (e.g., "Error('no listeners for endpoint')" or "Error('orphan connection')") (346).

Figure 4A:
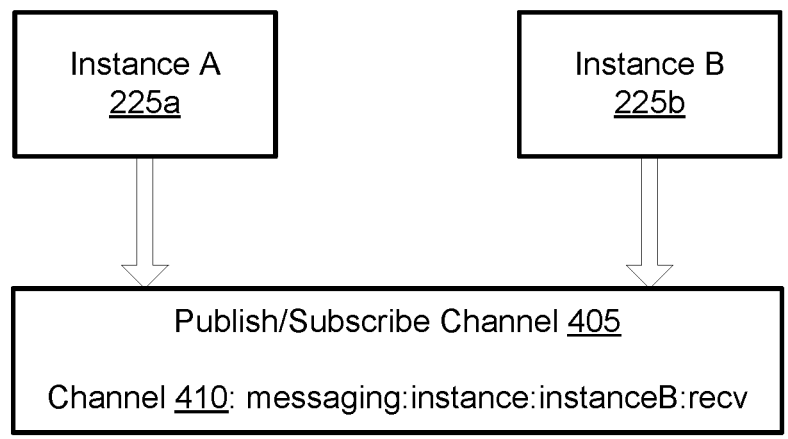
FIGS. 4A and 4B are block diagrams of an embodiment of a publish/subscribe channel for use in a system for providing messages via websocket connections.
Figure 4B:
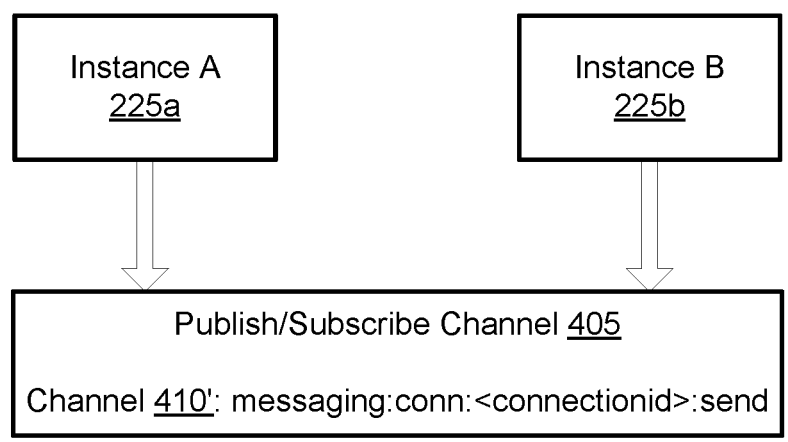

Referring now to FIGS. 4A and 4B, depicted are block diagrams of an embodiment of a publish/subscribe channel for use in a system for providing messages via websocket connections. In both FIGS. 4A and 4B, the first instance 225a may be the one that is publishing and the second instance 225b may be the one that is subscribing. In FIG. 4A, a scenario of a receive channel 400a is illustrated. The publish/subscribe channel 405 in this case may include a channel 410 with the parameter (e.g., "messaging:instance: instance:recv") indicating receipt of the publication by the second instance 225b. In FIG. 4B, a scenario of a send channel 400b is illustrated. In this case, the publish/subscribe channel 405 in this case may include a channel 410' with the parameter (e.g., "messaging:conn:<connectionid>: send") indicating distribution of the publication by the first instance 225b.

In addition, the infrastructure may, in addition or alternatively, provide for communication via queue services, in which message requests and responses may be exchanged via incoming and outgoing queues. With the use of an endpoint and instance registry, a state of each messaging system instance may be stored to identify the proper connection handler to forward the message. Moreover, the messaging system may store payload for large, overflow messages in a storage. The infrastructure may also allow for long live connections by managing such connections using a websocket pool. Furthermore, the infrastructure may allow for multiple tenants at the on-premise center to communicate messages.

For outgoing flow, the messaging system may maintain a plurality of queues of requests for communicating to endpoints. Each instance may be assigned its own queue such that the queues are specific to a messaging instance. The messaging system may receive a request and may identify a connection handler instance containing a direct websocket connection with the specified endpoint by accessing the cache storage. A messaging application instance of a messaging application interface (e.g., RESTful API) may submit a message to the identified connection handler instance via a service bus. Once a new message is received from the outgoing flow queue, the connection handler may then obtain a websocket connection to a connector communicatively coupled to the target endpoint. When the websocket connection becomes available, the message may then be forwarded to the target endpoint via the websocket connection.

In contrast, for incoming flow, the target endpoint may send a reply back to the connection handler via an established websocket connection. The connection handler may then forward the response to the request originator.

Once a new message, such as the response, is received from the incoming flow queue, the Restful API instance replies the messaging system consumer (for instance, the connection handler instance that received the response) by identifying the respective request from which the response originated.

To handle websocket connections, an endpoint may indicate that the endpoint is available for communications by requesting a websocket connection with the messaging system. The messaging system can establish the websocket connection. With completion of the handshake, the established websocket connection may be included in a connection pool for the endpoint for incoming requests for communication. In addition, the connection handler may use consumer/producer pattern to synchronize access for endpoint connections. To this end, the connection handler may consume a connection from the connection pool and may wait until another connection becomes available for a specific endpoint. The connection handler may also produce a connection in the connection pool, subsequent to completion of transmission of a message or when a new connection from the endpoint is established.

Figure 5A:
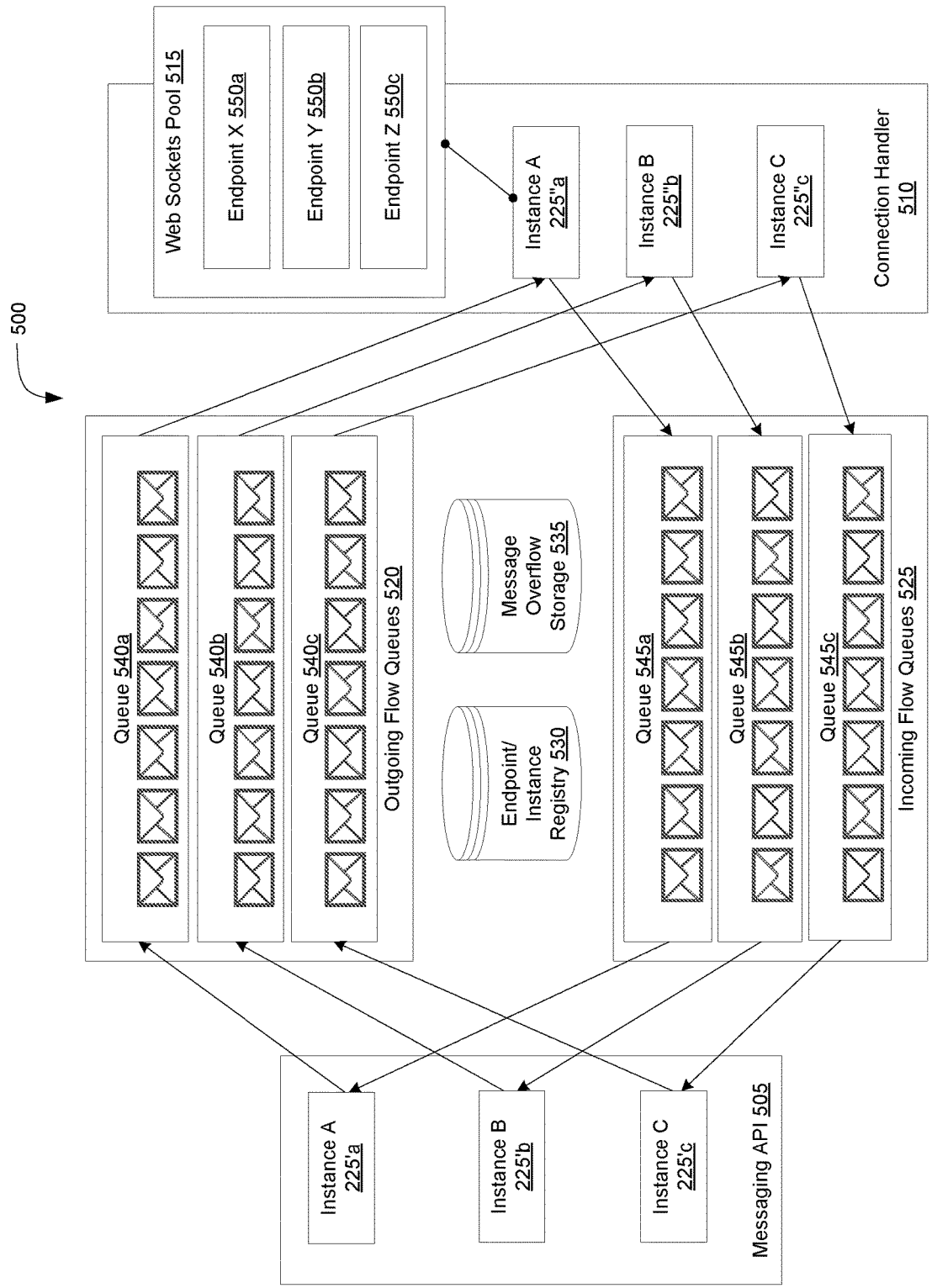
FIGS. 5A and 5B are block diagrams of an embodiment of a system for providing messages via websocket connections.
Figure 5B:
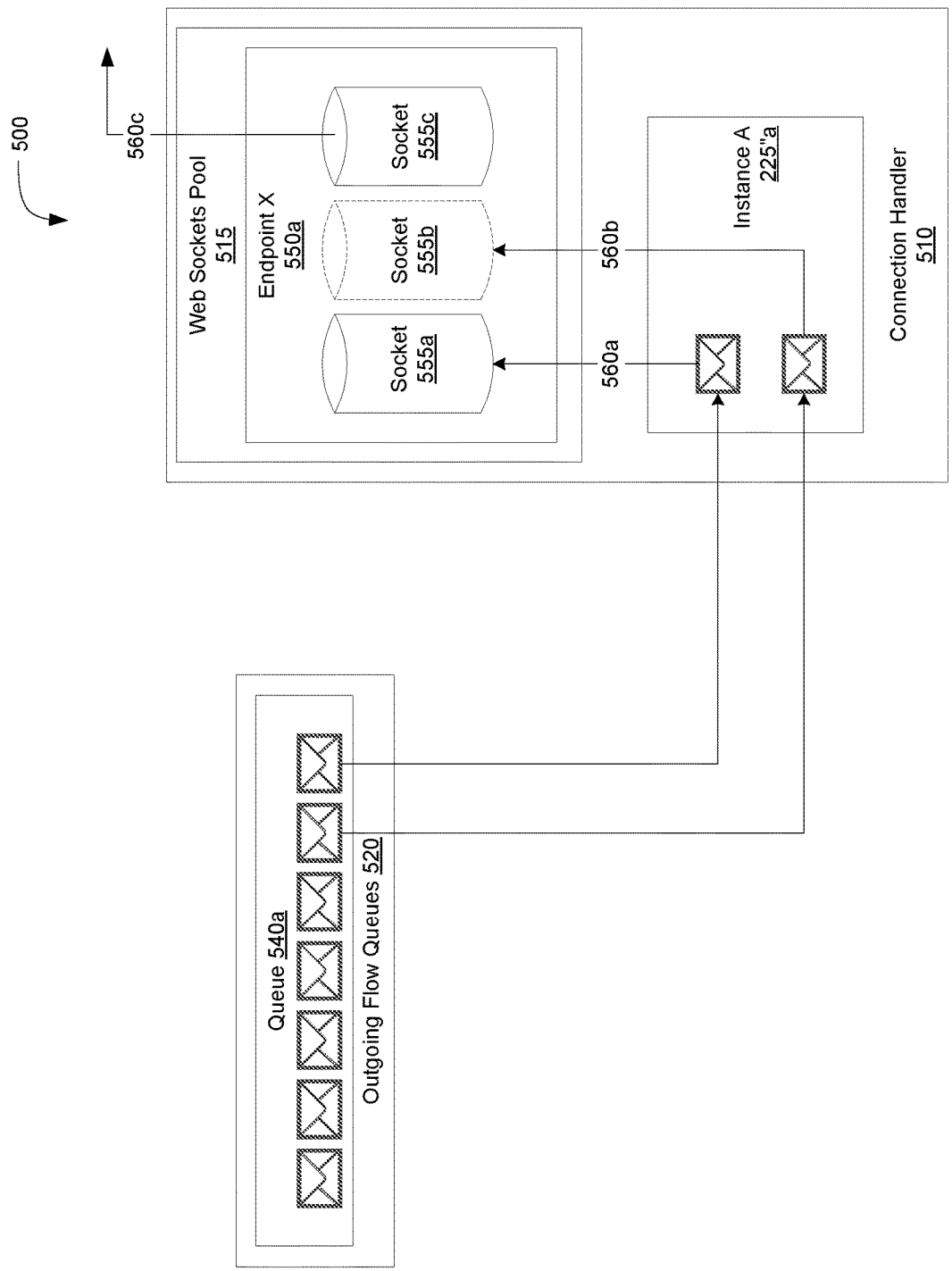

Referring now to FIGS. 5A and 5B, depicted are block diagrams of an embodiment of a system 500 for providing messages via websocket connections. Components of the system 500 may be part of the messaging system 205, such as the load-balancing server 240 or the one or more messaging system instances 220a-n (and the queue interface 285). Each component of the system 500 may be implemented using hardware or a combination of hardware or software detailed above in connection with FIGS. 1A-1D. For instance, each of these elements or entities can include any application, program, library, script, task, service, process or any type and form of executable instructions executing on hardware of the messaging system 205. The hardware includes circuitry such as one or more processors in one or more embodiments.

Starting with FIG. 5A, the system 500 may include a messaging application programming interface (API) 505, connection handlers 510, a set of outgoing flow queues 520, a set of incoming flow queues 525, an endpoint/instance registry 530, and a message overflow storage 535. In the context of FIG. 2, in processing the messages exchanged between the messaging system 205 and the connectors 220a-n of the on-premise center 210, each websocket instance 220a-n may store one or more messages in a queue maintained using system 500. Each websocket instance 220a-n may send the one or more messages upon identifying an available websocket connection with the endpoint of the connector 220a-n designated by the message.

The messaging Application Programming Interface (API) 505 may be a web service, such as a representational state transfer (RESTful) API, and may maintain one or more instances 225a-n corresponding to the messaging system instances 225a-n described above. The one or more instances 225a-n corresponding to the messaging API 505 may correspond or mirror the messaging system instances 225a-n detailed above in conjunction with FIGS. 2A and 2B. The connection handler 510 may also maintain one or more instances 225a-n corresponding to the messaging system instances 225a-n detailed above in conjunction with FIGS. 2A and 2B. The one or more instances 225'a-n maintained by the connection handler 510 may correspond or mirror the messaging system instances 225a-n detailed above in connection with the messaging system 205. Each instance 225a-n at the messaging API 505 may have a corresponding instance 225a-n on the connection handler 510. In some embodiments, each instance 225a-n at the messaging API 505 may interface with the corresponding instance 225a-n on the connection handler 510. The queue interface 285 of each instance 225a-n may interface or relay the message, connection identifier, and other metadata, among others, to the corresponding interface 225a-n or 225a-n.

The endpoint/instance registry 530 may maintain and include the connection identifier for the websocket connections maintained by each messaging system instance 225a-n of the messaging system 200, each instance 225a-n of the messaging API 505, and each instance 225a-n of the connection handler 510. The instances 225a-n of the messaging API 505 may be associated with the same connection identifier as the messaging system instance 225a-n for the websocket connection with the corresponding connector 220a-n. The instances 225a-n of the connection handler 510 may be associated with the same connection identifier as the instance 225a-n for the websocket connection with the corresponding connector 220a-n. The endpoint/instance registry 530 may also include identifiers for the endpoints for the connectors 220a-n.

The outgoing flow queues 520 and the incoming flow queues 525 may be part of a service bus for the messaging system 205. The outgoing flow queues 520 may include a set of queues 540a-n. The incoming flow queues 525 may also include a set of queues 545a-n. Each queue 540a-n and 545a-n may correspond to a respective instance 225a-n and 225a-n. Each queue 540a-n of the outgoing flow queues 520 may include one or more messages from the corresponding instance 225a-n maintained by the messaging API 505. Each queue 545a-n of the incoming flow queues 525 may include one or more messages from the corresponding instance 225a-n maintained by the connection handler 510. If any of the queues 540a-n or queues 545a-n receive more messages than capacity, the corresponding messages may be stored on a message overflow storage 535. The message overflow storage 535 may store and maintain messages from the instances 225a-n or 225a-n.

When a message directed to an endpoint of the connector 220a-n is received by one of the instances 225a-n, the corresponding instance 225a-n of the messaging API 505 may direct the message to the corresponding queue 540a-n of the outgoing flow queues 520. The corresponding instance 225a-n may determine whether the addition of the message will make the queue 540a-n above capacity. If the addition of the message will make the queue 540a-n above capacity, the corresponding instance 225a-n may add the message to the message overflow storage 535. Otherwise, if the addition of the message will not make the queue 540a-n above capacity, the corresponding instance 225a-n may add the message to the corresponding queue 540a-n. In turn, the corresponding instance 225a-n of the connection handler 510 may access the respective queue 540a-n to retrieve the outbound message. The corresponding instance 225a-n may forward the message to the target endpoint (e.g., one or more clients 215a-n at the on-premise center 210).

When a message from the endpoint of the connector 220a-n directed is to one of the instances 225a-n, the corresponding instance 225a-n of the connection handler 510 may direct the message to the corresponding queue 545a-n of the ingoing flow queues 525. The corresponding instance 225a-n may determine whether the addition of the message will make the queue 540a-n above capacity. In this manner, the service bus of the message system 205 may service large messages for transmission to the designated endpoint. If the addition of the message will make the queue 545a-n above capacity, the corresponding instance 225a-n may add the message to the message overflow storage 535. Otherwise, if the addition of the message will not make the queue 545a-n above capacity, the corresponding instance 225a-n may add the message to the corresponding queue 540a-n. In turn, the corresponding instance 225a-n of the messaging API 505 may access the respective queue 545a-n to retrieve the inbound message. The corresponding instance 225a-n may forward the message to the corresponding instance 225a-n. The corresponding instance 225a-n in turn may generate a reply message and may identify the destination endpoint 220a-n to which to send the reply message. The reply message may be sent to the endpoint of the connector 220a-n using the techniques described above in conjunction with the outgoing flow queues 520.

Referring now to FIG. 5B, shown in further detail is the connection handler 510 exchanging messages with a websocket connections pool 515. The websocket connections pool 515 may include one or more socket connections 555a-n. In the context of FIG. 2, in processing the messages exchanged between the messaging system 205 and the connectors 220a-n of the on-premise center 210, each websocket instance 220a-n may identify the connector 220a-n to which to send the message. The messaging system 205 may identify the websocket instance 220a-n with one or more websocket connections established with the connector 220a-n.

In further detail, once a message is retrieved from the respective queue 540a by the corresponding instance 225a-n of the connection handler 510, the connection handler 510 may identify an available socket connection 555a-n through which to send the message. The connection handler 510 may identify the endpoint 550a-n designated by the message. Each endpoint 550a-n may be associated with one or more socket connections 555a-n. Using the identified endpoint 550a-n, the connection handler 510 may determine which of the socket connections 555a-n of the websocket connections pool 515 are available. The connection handler 510 may determine a status of each of the socket connections 555a-n. In some embodiments, the socket connections 555a-n may be consumed by a connection with the message from the queue 540a-n. In some embodiments, the socket connections 555a-n may be consumed by a connection with the connector 220a-n for the designated endpoint. In some embodiments, the socket connections 555a-n may be in waiting for a connection either for the message from the queue 540a-n or the connector 220a-n. In the example depicted in FIG. 5C, the connection 560a for the first socket connection 555a may be consumed by one of the messages from the queue 540. In addition, the connection 560b for the second socket connection 555b may be in waiting for another message from the queue 540 (as indicated by dotted line). Lastly, the connection 560c from the third socket connection 555c may be consumed for communication with the connector 220a-n of the endpoint designated by the message. Having identified the available socket connections 555a-n for the designated endpoint, the connection handler 510 may submit or forward the message for the instance 225a-n to the connector 220a-n designated by the message via one of the available socket connections 555a-n.

Figure 6A:
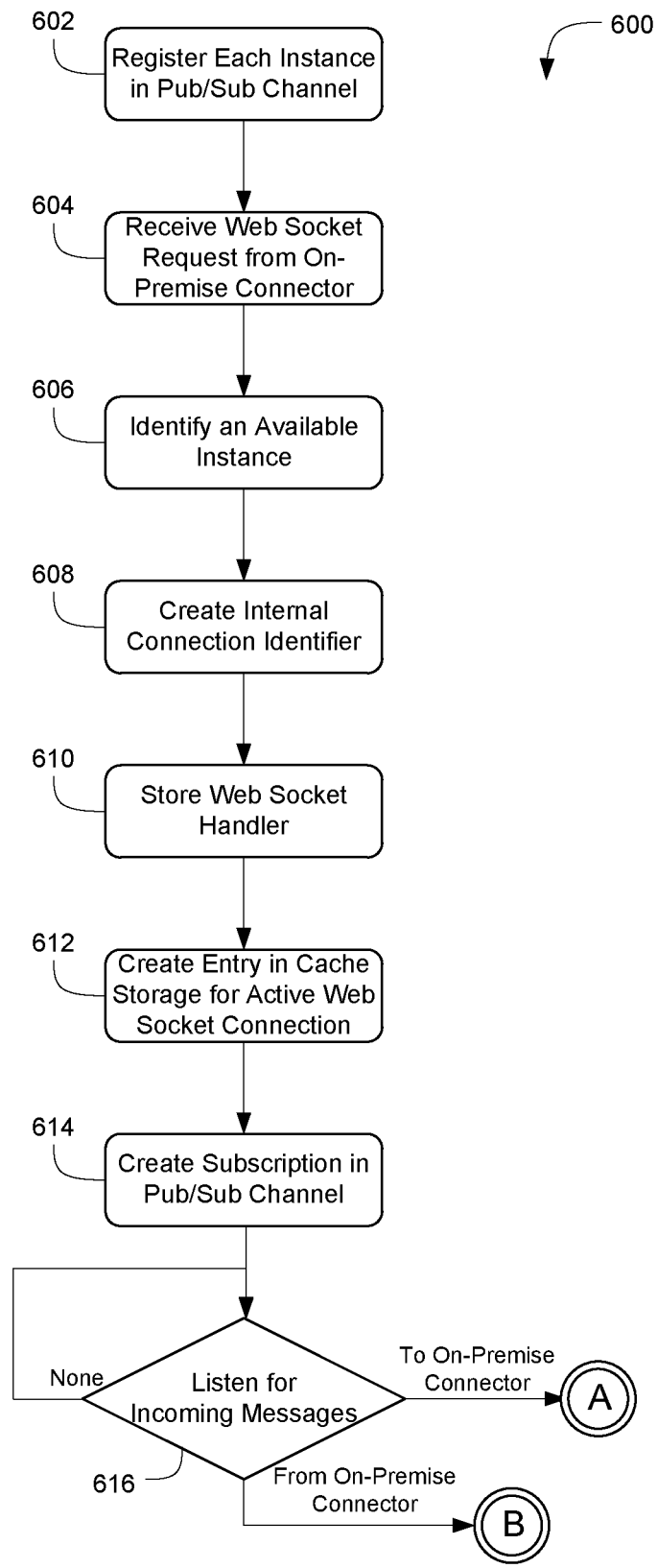
FIGS. 6A-6C are flow diagrams of an embodiment of a method for providing messages via websocket connections.
Figure 6B:
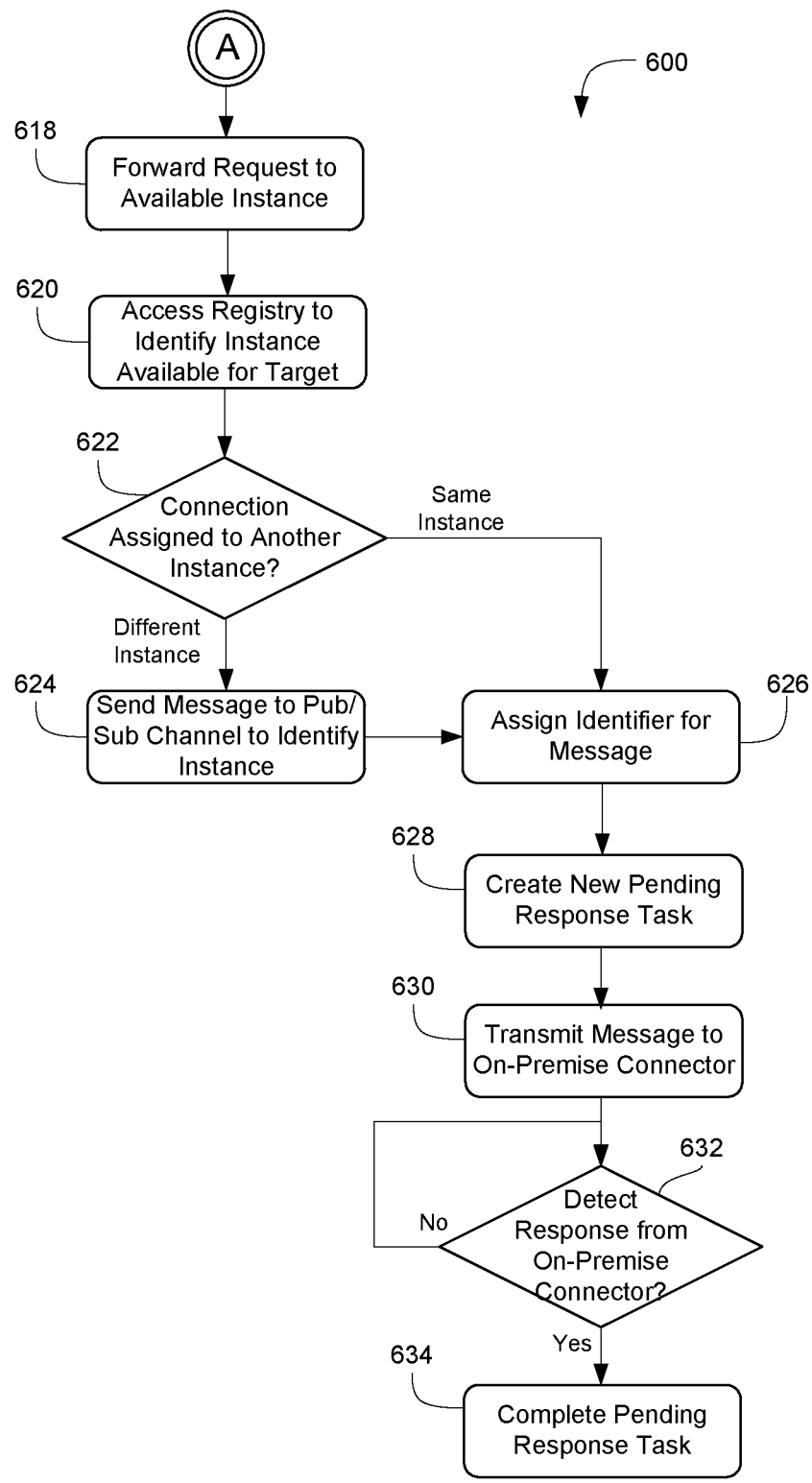
Figure 6C:
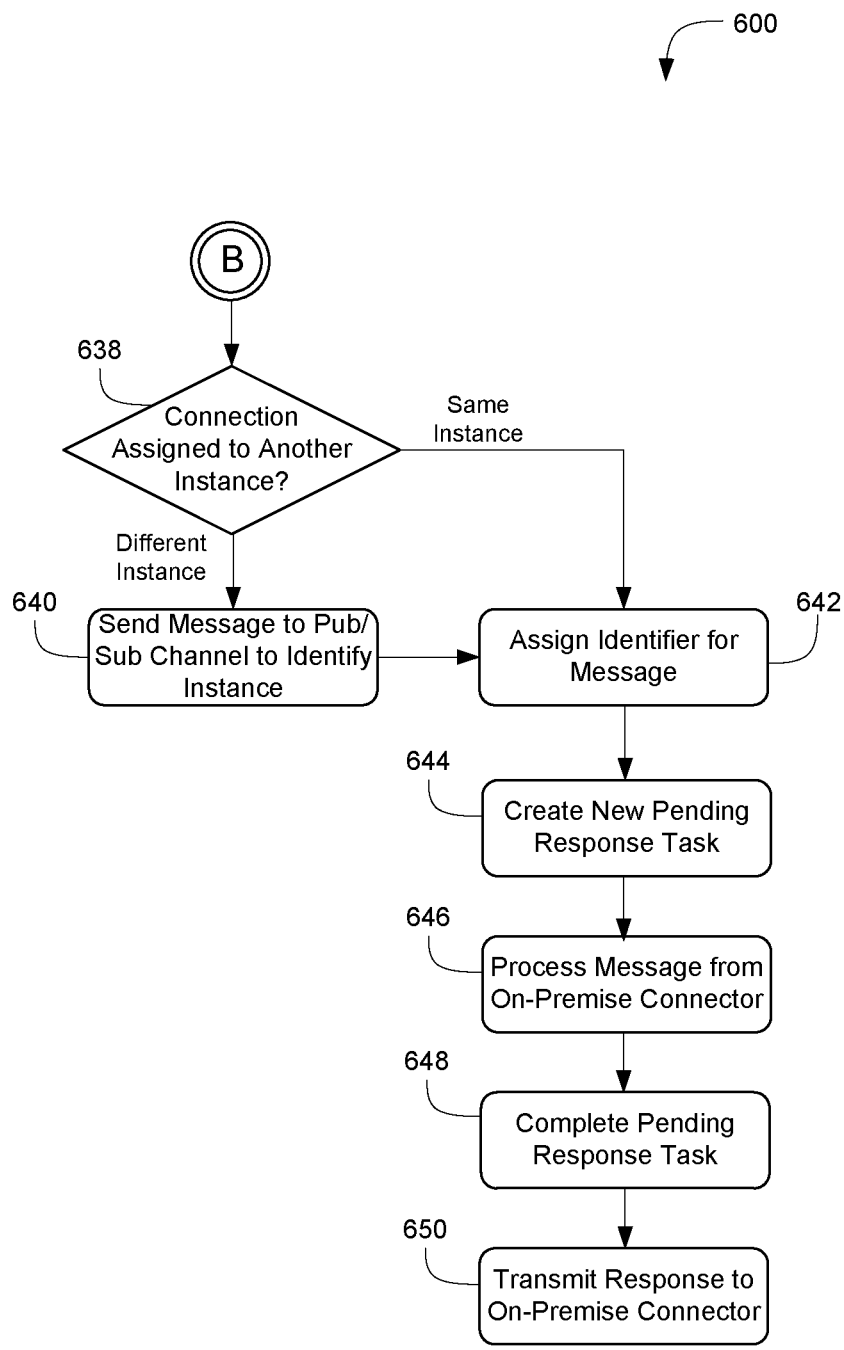

Referring now to FIGS. 6A-6C, depicted are flow diagrams of an embodiment of a method 600 for providing messages via websocket connections. The operations and functionalities of the method 600 may be performed by the system 200 and/or the system 500 detailed above. Starting with FIG. 6A, a messaging system may initialize each instance by registering each instance in a publish/subscribe channel (602). The messaging system may receive a websocket connection request from an on-premise connector (604). The messaging system may identify an available instance (606). The messaging system may create an internal connection identifier for the connection with the on-premise connector (608). The messaging system may store a websocket handler for the connection with the on-premise connector (610). The messaging system may create a listener registry entry in a cache store for the active websocket connection with the on-premise connector (612). The messaging system may create a subscription in the publish/subscribe channel (614). The messaging system may then listen for incoming messages (616).

If the message is to an on-premise connector, the messaging system may execute the functionalities laid out in FIG. 6B. Moving onto FIG. 6B, the messaging system may forward the message request to an available instance (618). The messaging system may access the listener registry to identify an instance available for designated connector (620). The messaging system may determine whether the connection is assigned to an another instance (622). If the connection is assigned to another instance, the messaging system may send the message to a publish/subscribe channel to identify the other instance (624). In any event, the messaging system may assign an identifier for the message (626). The messaging system may create a new pending response task (628). The messaging system may transmit the message to the on-premise connector for the designated endpoint via the websocket connection (630). The messaging system may detect a response from the on-premise connector for the designated endpoint via the websocket connection (632). Upon detection of the response from the on-premise connector, the messaging system may complete the pending response task (634).

On the other hand, if the message is to the on-premise connector, the messaging system may execute the functionalities laid out in FIG. 6C. Referring lastly to FIG. 6C, the messaging system may determine whether the connection is assigned to an another instance (638). If the connection is assigned to another instance, the messaging system may send the message to a publish/subscribe channel to identify the other instance (640). In any event, the messaging system may assign an identifier for the message (626). The messaging system may create a new pending response task (642). The messaging system may process the message to send to the on-premise connector for the designated endpoint via the websocket connection (646). The messaging system may complete the pending response task (648), and may transmit the response to the on-premise connector (650).

Figure 7:
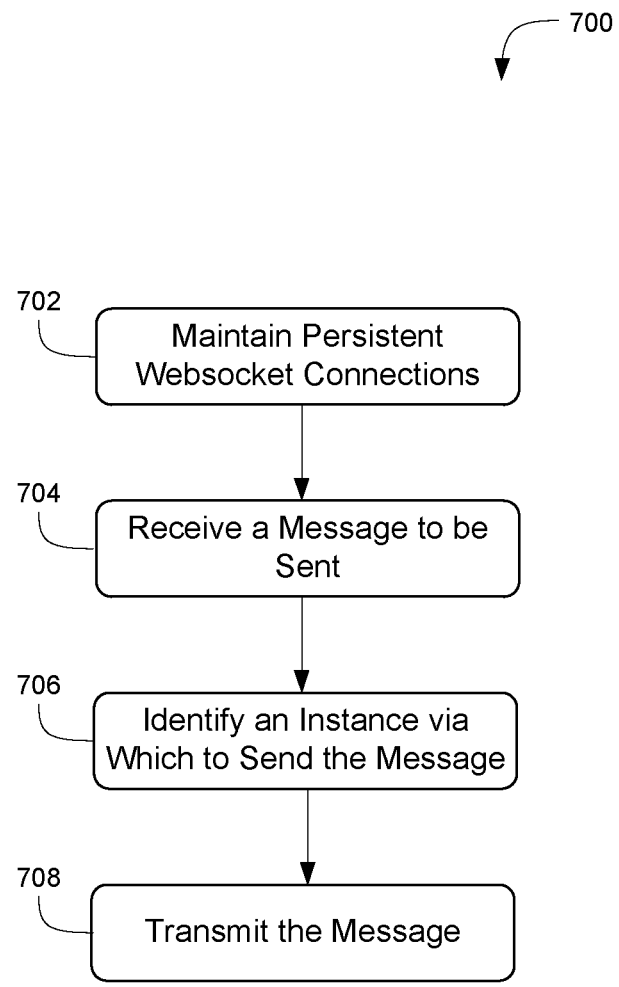
FIG. 7 is a flow diagram of an embodiment of a method for providing messages via websocket connections.

Referring now to FIG. 7, a method for providing messages via websocket connections is depicted. The method includes the steps of maintaining persistent websocket connections (702), receiving a message to be sent (704), identifying an instance via which to send the message (706) and transmitting the message (708).

In further detail, in some embodiments, maintaining persistent websocket connections (702) includes maintaining, by a messaging system, on a first network, via the plurality of messaging system instances of the messaging system, a plurality of persistent websocket connections between each of a plurality of on-premise connectors and each of the plurality of messaging system instances.

In some embodiments, receiving a message to be sent (704) includes receiving, by the messaging system, a message to be sent to an endpoint on a second network of an on-premise connector of the plurality of on-premise connectors.

In some embodiments, identifying an instance via which to send the message (706) includes identifying, by the messaging system, via a registry associating on-premise connector endpoints to messaging instances, a messaging system instance of the plurality of messaging system instances via which to send the message to the endpoint, the messaging system instance maintaining the websocket connection to the on-premise connector in communication with the endpoint. In some embodiments, by the messaging system can identify the messaging system instance of the messaging system that established the websocket connection to the on-premise connector by submitting the message to a candidate messaging system instance, determining, by the candidate messaging system instance, that there is an available websocket connection to the on-premise connector and identifying, by the candidate messaging system instance, that the messaging system instance that established the websocket connection is the candidate messaging system instance. If the candidate messaging system instance determines that the messaging system instance that established the websocket connection is not the candidate messaging system, then the candidate messaging system instance can publish the message to a publish/subscribe channel identifying a connection identifier of the websocket connection.

In some embodiments, transmitting the message (708) includes transmitting, by the messaging system, the message to the endpoint via the websocket connection to the on-premise connector. In some embodiments, the websocket connection can previously be established. In some embodiments, the websocket connection can be established upon determining that there are no available websocket connections. In some embodiments, the method includes establishing, by the messaging system instance, the websocket connection to the on-premise connector. In some embodiments, establishing the websocket connection includes creating a subscription in a publish/subscribe channel, the subscription identifying a connection identifier identifying the websocket connection.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed:

1. A system for providing messages via websocket connections, comprising:
 a messaging system including a plurality of messaging system instances, the messaging system configured to:
  maintain, on a first network, via each messaging system instance of the plurality of messaging system instances of the messaging system, a persistent websocket connection between the messaging system instance and at least one of a plurality of on-premise connectors using a registry associating the plurality of on-premise connectors and the plurality of messaging system instances;
  receive a message to be sent to an endpoint on a second network of an on-premise connector of the plurality of on-premise connectors; and
  identify, via the registry associating the plurality of on-premise connectors to the plurality of messaging instances, a messaging system instance of the plurality of messaging system instances via which to send the message to the endpoint, the messaging system instance maintaining the websocket connection to the on-premise connector in communication with the endpoint,
  wherein the messaging system instance is configured to transmit the message to the endpoint via the websocket connection to the on-premise connector.

2. The system of claim 1, wherein the messaging instance establishes the websocket connection with the on-premise connector and creates a subscription in a publish/subscribe channel, the subscription identifying a connection identifier identifying the websocket connection.

3. The system of claim 1, wherein to identify the messaging system instance of the plurality of messaging system instances, the messaging system is further configured to submit the message to a candidate messaging system instance, and
 wherein the candidate messaging system instance configured to:
  determine that there is an available websocket connection to the on-premise connector; and
  identify that the messaging system instance that established the websocket connection is the candidate messaging system instance.

4. The system of claim 1, wherein to identify the messaging system instance, the messaging system is further configured to submit the message to a candidate messaging system instance, and
 wherein the candidate messaging system instance is configured to:
  determine that there is a websocket connection available for the endpoint of the on-premise connector;
  determine that the messaging system instance that established the websocket connection is not the candidate messaging system; and
  publish the message to a publish/subscribe channel identifying a connection identifier of the websocket connection.

5. The system of claim 4, wherein the messaging system instance is further configured to:
 determine that the message published in the publish/subscribe channel identifies the connection identifier of the websocket connection that was established by the messaging system instance; and
 receive the message via the publish/subscribe channel to transmit to the endpoint of the on-premise connector.

6. The system of claim 1, wherein the message is a first message and wherein the messaging system instance is further configured to:
 receive a second message from the endpoint of the on-premise connector, the second responsive to the first message; and
 transmit the second message to a caller that originated the first message.

7. The system of claim 1, wherein the message is a first message and the messaging system instance is the first messaging system instance and wherein a second messaging system instance of the plurality of messaging system instances is further configured to:
 receive a second message from the endpoint of the on-premise connector, the second message responsive to the first message;
 publish the second message to a publish/subscribe channel; and
 wherein the first messaging instance is further configured to:
  receive the second message from the publish/subscribe channel; and
  transmit the second message to a caller that originated the first message.

8. The system of claim 1, wherein the registry comprises a plurality of entries, each entry of the entries pairing a respective websocket connection to i) a respective messaging system instance that established the respective websocket connection, or ii) a listener specific to a respective endpoint of the on-premise connector, the listener established by the messaging system instance that established the respective websocket connection.

9. The system of claim 1, wherein to identify the messaging system instance of the messaging system that established the websocket connection to the endpoint of the on-premise connector to which the message is to be forwarded, the messaging system is further configured to:
- identify the on-premise connector to which to transmit the message; and
- identify a messaging system instance that has one or more websocket connections established with the on-premise connector.

10. The system of claim 9, wherein the messaging system is further configured to:
- store the message in a queue of the messaging system instance; and wherein the messaging system instance is further configured to:
- retrieve the message from the queue; and
- identify, prior to transmitting the message via the websocket connection to the endpoint, an available websocket connection from a pool of websocket connections established with the endpoint of the on-premise connector.

11. A method for providing messages via websocket connections, comprising:
- maintaining, by a messaging system, on a first network, via each messaging system instance of a plurality of messaging system instances of the messaging system, a persistent websocket connection between the messaging system instance and at least one a plurality of on-premise connectors using a registry associating the plurality of on-premise connectors and the plurality of messaging system instances;
- receiving, by the messaging system, a message to be sent to an endpoint on a second network of an on-premise connector of the plurality of on-premise connectors;
- identifying, by the messaging system, via the registry associating the plurality of on-premise connectors to the plurality of messaging instances, a messaging system instance of the plurality of messaging system instances via which to send the message to the endpoint, the messaging system instance maintaining the web socket connection to the on-premise connector in communication with the endpoint; and
- transmitting, by the messaging system, the message to the endpoint via the websocket connection to the on-premise connector.

12. The method of claim 11, further comprising establishing, by the messaging system instance, the websocket connection to the on-premise connector, wherein establishing the websocket connection comprises creating a subscription in a publish/subscribe channel, the subscription identifying a connection identifier identifying the websocket connection.

13. The method of claim 11, wherein identifying, by the messaging system, the messaging system instance of the messaging system that established the websocket connection to the on-premise connector comprises:
- submitting the message to a candidate messaging system instance;
- determining, by the candidate messaging system instance, that there is an available websocket connection to the on-premise connector; and
- identifying, by the candidate messaging system instance, that the messaging system instance that established the websocket connection is the candidate messaging system instance.

14. The method of claim 11, wherein identifying, by the messaging system, the messaging system instance of the messaging system that established the websocket connection to the endpoint of the on-premise connector to which the message is to be forwarded comprises:
- submitting the message to a candidate messaging system instance;
- determining, by the candidate messaging system instance, that there is a websocket connection available for the endpoint of the on-premise connector;
- determining, by the candidate messaging system instance, that the messaging system instance that established the websocket connection is not the candidate messaging system; and
- publishing, by the candidate messaging system instance, the message to a publish/subscribe channel identifying a connection identifier of the websocket connection.

15. The method of claim 14, wherein the messaging system instance that established the websocket connection to the endpoint of the on-premise connector comprises:
- determining, by the messaging system instance, that the message published in the publish/subscribe channel identifies the connection identifier of the websocket connection that was established by the messaging system instance; and
- receiving, by the messaging system instance, the message via the publish/subscribe channel to transmit to the endpoint of the on-premise connector.

16. The method of claim 11, wherein the message is a first message and wherein the method further comprises:
- receiving, by the messaging system instance, a second message from the endpoint of the on-premise connector, the second responsive to the first message; and
- transmitting, by the messaging system instance, the second message to a caller that originated the first message.

17. The method of claim 11, wherein the message is a first message and wherein the method further comprises:
- receiving, by a second messaging system instance, a second message from the endpoint of the on-premise connector, the second responsive to the first message;
- publishing, by the second messaging instance, the second message to a publish/subscribe channel;
- receiving, by the messaging system instance, the second message from the publish/subscribe channel; and
- transmitting, by the messaging system instance, the second message to a caller that originated the first message.

18. The method of claim 11, wherein the registry comprises a plurality of entries, each entry of the entries pairing a respective websocket connection to i) a respective messaging system instance that established the respective websocket connection, or ii) a listener specific to a respective endpoint of the on-premise connector, the listener established by the messaging system instance that established the respective websocket connection.

19. The method of claim 11, wherein identifying, by the messaging system, a messaging system instance of the messaging system that established the websocket connection to the endpoint of the on-premise connector to which the message is to be forwarded comprises:
- identifying, by the messaging system, the on-premise connector to which to transmit the message; and
- identifying, by the messaging system, a messaging system instance that has one or more websocket connections established with the on-premise connector.

20. The method of claim 19, further comprising:
- storing, by the messaging system, the message in a queue of the messaging system instance;

retrieving, by the messaging system instance, the message from the queue;

identifying, prior to transmitting the message via the websocket connection to the endpoint, by the messaging system instance, an available websocket connection from a pool of websocket connections established with the endpoint of the on-premise connector.

* * * * *